(12) United States Patent
Park et al.

(10) Patent No.: US 11,659,403 B2
(45) Date of Patent: May 23, 2023

(54) METHOD AND APPARATUS FOR SHARING FREQUENCY RESOURCE DYNAMICALLY IN WIRELESS COMMUNICATION SYSTEM

(71) Applicant: Samsung Electronics Co., Ltd., Gyeonggi-do (KR)

(72) Inventors: Seungil Park, Gyeonggi-do (KR); Youngjoon Kim, Gyeonggi-do (KR); Hyojin Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 97 days.

(21) Appl. No.: 17/107,222

(22) Filed: Nov. 30, 2020

(65) Prior Publication Data

US 2021/0168619 A1    Jun. 3, 2021

(30) Foreign Application Priority Data

Nov. 29, 2019    (KR) .................... 10-2019-0157094

(51) Int. Cl.
*H04W 16/14* (2009.01)
*H04W 24/10* (2009.01)
(Continued)

(52) U.S. Cl.
CPC ........... *H04W 16/14* (2013.01); *H04W 24/08* (2013.01); *H04W 24/10* (2013.01);
(Continued)

(58) Field of Classification Search
CPC ..... H04W 16/10; H04W 16/14; H04W 24/08; H04W 24/10; H04W 52/367;
(Continued)

(56) References Cited

U.S. PATENT DOCUMENTS 9,357,399 B2    5/2016    Kwon et al.
10,462,675 B2   10/2019   Gosh et al.
(Continued)

FOREIGN PATENT DOCUMENTS

EP    2 160 056    3/2010
EP    3 739 926    11/2020
(Continued)

OTHER PUBLICATIONS

International Search Report dated Feb. 26, 2021 issued in counterpart application No. PCT/KR2020/016857, 9 pages.
(Continued)

*Primary Examiner* — Shah M Rahman
(74) *Attorney, Agent, or Firm* — The Farrell Law Firm, P.C.

(57) ABSTRACT

A method, performed by a first base station, of sharing a frequency resource with a second base station in a wireless communication system is provided. The method includes transmitting, to channel measurement target terminals determined from among terminals communicating with the first base station using first frequency resources, information instructing to transmit a signal for channel measurement to the second base station; transmitting, to the second base station, information indicating that the signal for channel measurement is to be transmitted from the channel measurement target terminals; receiving, from the second base station, measurement information about channels between the second base station and the channel measurement target terminals; determining a shared frequency resource to be shared with the second base station from among the first frequency resources, based on the measurement information about the channels between the second base station and the channel measurement target terminals; and transmitting
(Continued)

information about the shared frequency resource to the second base station.

20 Claims, 20 Drawing Sheets

(51) Int. Cl.
  *H04W 24/08* (2009.01)
  *H04W 72/0453* (2023.01)
  *H04W 52/36* (2009.01)
  *H04W 72/23* (2023.01)
(52) U.S. Cl.
  CPC ..... *H04W 52/367* (2013.01); *H04W 72/0453* (2013.01); *H04W 72/23* (2023.01)
(58) Field of Classification Search
  CPC ........... H04W 72/042; H04W 72/0453; H04W 92/20; H04L 1/0002; H04L 1/0015; H04L 5/001; H04L 5/003; H04L 5/0035; H04L 5/0055; H04L 5/0073
  See application file for complete search history.

(56) References Cited

U.S. PATENT DOCUMENTS

| | | | |
|---|---|---|---|
| 10,582,502 B2 | 3/2020 | Wei et al. | |
| 11,357,016 B2 | 6/2022 | Kusashima et al. | |
| 2007/0191015 A1* | 8/2007 | Hwang | H04W 72/046 455/442 |
| 2010/0254323 A1 | 10/2010 | Youn et al. | |
| 2011/0205923 A1* | 8/2011 | Doll | H04B 17/24 370/252 |
| 2011/0235601 A1* | 9/2011 | Yoo | H04L 5/0073 370/329 |
| 2013/0189990 A1 | 7/2013 | Kim et al. | |
| 2013/0322287 A1* | 12/2013 | Bontu | H04L 1/0015 370/252 |
| 2013/0329612 A1 | 12/2013 | Seo et al. | |
| 2014/0024388 A1* | 1/2014 | Earnshaw | H04W 72/02 455/452.2 |
| 2015/0181589 A1* | 6/2015 | Luo | H04L 27/0006 370/329 |
| 2015/0215874 A1* | 7/2015 | Chen | H04W 52/346 455/522 |
| 2016/0112925 A1* | 4/2016 | Qin | H04W 36/023 370/332 |
| 2016/0135057 A1 | 5/2016 | Wang et al. | |
| 2016/0242038 A1* | 8/2016 | Lei | H04W 72/0446 |
| 2017/0013470 A1* | 1/2017 | Sun | H04W 74/0816 |
| 2017/0257774 A1* | 9/2017 | Ghosh | H04L 5/001 |
| 2017/0302419 A1* | 10/2017 | Liu | H04W 72/042 |
| 2020/0119876 A1* | 4/2020 | Tong | H04B 7/0626 |
| 2020/0374892 A1* | 11/2020 | Kusashima | H04W 28/22 |

FOREIGN PATENT DOCUMENTS

| | | |
|---|---|---|
| KR | 10-1559320 | 5/2016 |
| KR | 10-1943509 | 1/2019 |
| WO | WO 2019/138630 | 7/2019 |

OTHER PUBLICATIONS

CoMP, eIDIC (Sep. 19, 2015), 12 pages.
CoMP (1) CoMP Categories—CS, CB, JT, and DPS (Jul. 25, 2014), 12 pages.
Waveform Candidate 5G, "5G/NR Initial Access/RACH", https://www.sharetechnote.com/html/5G/5G_RACH.html, Nov. 25, 2020, 56 pages.
ZadoffChuSeq, Mathworks, https://kr.mathworks.com/help/comm/ref/zadoffchuseq.html, Nov. 25, 2020, 3 pages.
European Search Report dated Nov. 15, 2022 issued in counterpart application No. 20894595.6-1216, 12 pages.

* cited by examiner

METHOD AND APPARATUS FOR SHARING FREQUENCY RESOURCE DYNAMICALLY IN WIRELESS COMMUNICATION SYSTEM

CROSS-REFERENCE TO RELATED APPLICATION

This application is based on and claims priority under 35 U.S.C. § 119 to Korean Patent Application No. 10-2019-0157094, filed on Nov. 29, 2019, in the Korean Intellectual Property Office, the disclosure of which is incorporated by reference herein in its entirety.

BACKGROUND

1. Field

The disclosure relates generally to a method and apparatus for sharing a frequency resource dynamically in a wireless communication system.

2. Description of Related Art

Considering the development of mobile communication from generation to generation, technologies have been developed mainly for services targeting humans, such as voice calls, multimedia services, and data services. Following the commercialization of fifth generation (5G) communication systems, it is expected that the number of devices connected to communication networks will exponentially grow. Examples of connected devices may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the sixth generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bits per second (bps) and a radio latency less than 100 microseconds (μsec), and thus the speed will be 50 times as fast as 5G communication systems and have ¹/₁₀ the radio latency thereof.

In order to accomplish such a high data rate and an ultra-low latency, implementing 6G communication systems in a terahertz band (for example, 95 gigahertz to 3 terahertz bands) has been considered. It is expected that, due to more severe path loss and atmospheric absorption in the terahertz bands compared to those in millimeter wave (mmWave) bands introduced in 5G, technologies capable of securing the signal transmission distance (coverage) will become more crucial. It is necessary to develop, as major technologies for securing the coverage, multiantenna transmission technologies including radio frequency (RF) elements, antennas, novel waveforms having a better coverage than orthogonal frequency division multiplexing (OFDM), beamforming and massive multiple input multiple output (MIMO) technology, full dimensional MIMO (FD-MIMO) technology, array antennas, and large-scale antennas. In addition, there has been ongoing discussion on new technologies for improving the coverage of terahertz-band signals, such as metamaterial-based lenses and antennas, orbital angular momentum (OAM) technology, and reconfigurable intelligent surface (RIS) technology.

Moreover, in order to improve the spectral efficiency and overall network performances, 6G communication systems have employed technologies such as a full-duplex technology for enabling an uplink (UE transmission); a downlink (node B transmission) to simultaneously use the same frequency resource at the same time and a network technology for utilizing satellites, high-altitude platform stations (HAPS); an improved network structure for supporting mobile nodes B enabling network operation optimization and automation; a technology for using AI in wireless communication for improvement of overall network operation by considering AI from the initial phase of developing technologies for 6G and internalizing end-to-end AI support functions; and a next-generation distributed computing technology for overcoming UE computing ability limitations through reachable super-high-performance communication and computing resources (multi-access edge computing (MEC) and cloud computing) over the network.

It is expected that such research and development of 6G communication systems will bring the next hyper-connected experience to every corner of life. Particularly, it is expected that services such as truly immersive extended reality (XR), high-fidelity mobile hologram, and digital replica could be provided through 6G communication systems.

SUMMARY

The present disclosure has been made to address the above-mentioned problems and disadvantages, and to provide at least the advantages described below.

In accordance with an aspect of the disclosure, a method, performed by a first base station, of sharing a frequency resource with a second base station in a wireless communication system includes transmitting, to channel measurement target terminals determined from among terminals communicating with the first base station using first frequency resources, information instructing to transmit a signal for channel measurement to the second base station; transmitting, to the second base station, information indicating that the signal for channel measurement is to be transmitted from the channel measurement target terminals; receiving, from the second base station, measurement information about channels between the second base station and the channel measurement target terminals; determining a shared frequency resource to be shared with the second base station from among the first frequency resources, based on the measurement information about the channels between the second base station and the channel measurement target terminals; and transmitting information about the shared frequency resource to the second base station.

In accordance with another aspect of the disclosure, a method, performed by a second base station, of sharing a frequency resource with a first base station in a wireless communication system includes receiving, from the first base station, information indicating that a signal for channel measurement is to be transmitted from channel measurement target terminals determined from among terminals communicating with the first base station using first frequency resources; receiving the signal for channel measurement from the channel measurement target terminals; measuring channels between the second base station and the channel measurement target terminals based on the signal for channel measurement and the information indicating that the signal for channel measurement is to be transmitted; transmitting, to the first base station, measurement information about the channels between the second base station and the channel measurement target terminals; and receiving, from the first base station, information about a shared frequency resource that the first base station is to share with the second base station from among the first frequency resources, wherein the shared frequency resource is determined based on the measurement information about the channels between the second base station and the channel measurement target terminals.

In accordance with another aspect of the disclosure, a first base station for sharing a frequency resource with a second base station in a wireless communication system is provided. The first base station includes a communicator; a memory; and at least one processor connected to the communicator, and configured to transmit, to channel measurement target terminals determined from among terminals communicating with the first base station using first frequency resources, information to instruct transmission of a signal for channel measurement to the second base station; transmit, to the second base station, information indicating that the signal for channel measurement is to be transmitted from the channel measurement target terminals; receive, from the second base station, measurement information about channels between the second base station and the channel measurement target terminals; determine a shared frequency resource to be shared with the second base station from among the first frequency resources, based on the measurement information about the channels between the second base station and the channel measurement target terminals; and transmit information about the shared frequency resource to the second base station.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
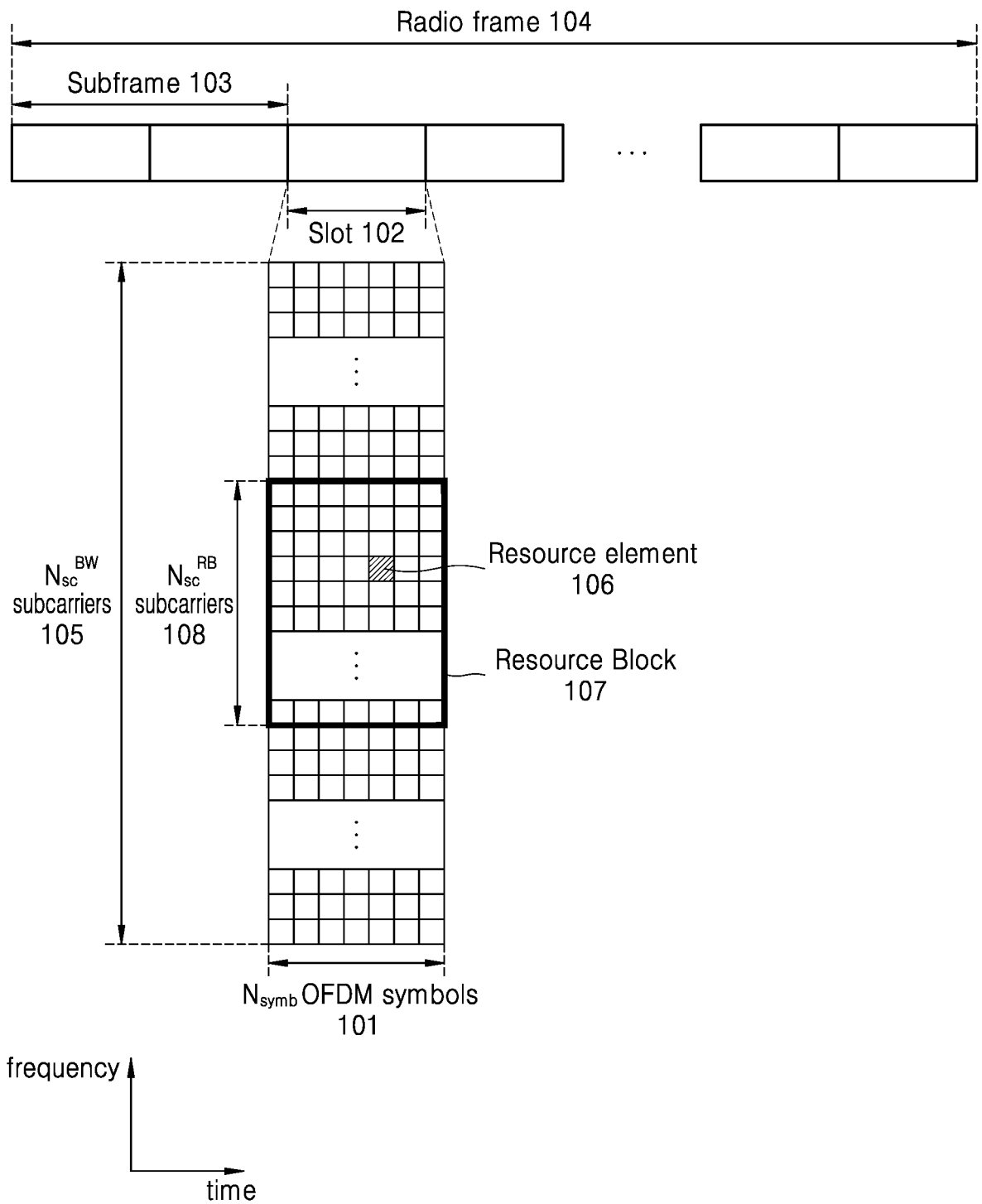
FIG. 1 is a diagram illustrating a basic structure of a time-frequency domain, which is a radio resource domain in a wireless communication system, according to an embodiment.

Provided are a method and apparatus for sharing a frequency resource dynamically in a wireless communication system.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

Hereinafter, an operation principle of the disclosure will be described in detail with reference to the accompanying drawings. In describing the disclosure, when the detailed description of the relevant known functions or configurations is determined to unnecessarily obscure the details of the disclosure, the detailed description thereof may be omitted. The terms as used herein are those defined by taking into account functions in the disclosure, but the terms may vary depending on the intention of users, those of ordinary skill in the art or precedents. Therefore, the definitions should be made based on the contents throughout the specification.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, or a multimedia system capable of performing a communication function.

In the disclosure, a controller may also be referred to as a processor.

Throughout the specification, a layer (or a layer apparatus) may also be referred to as an entity.

The terms for identifying access nodes, the terms referring to network entities, the terms referring to messages, the terms referring to an interface between network entities, and the terms referring to a variety of identification information, as used herein, are provided as an example for convenience of description. Therefore, the disclosure is not limited by the terms used herein, and other terms referring to objects having equivalent technical meanings may be used.

For convenience of description, the terms and names defined in the 3$^{rd}$ Generation Partnership Project Long-Term Evolution (3GPP LTE) standard may be used. However, the disclosure is not limited by the terms and names and may be equally applied to systems conforming to other standards. The term "eNB" as used in the disclosure may be used interchangeably with the term "gNB" for convenience of description. That is, a base station described as the eNB may represent the gNB.

In a general wireless communication system, a specific frequency resource is exclusively assigned for a specific service. Typically, in the case of cellular communication, a country leases a specific frequency resource to a specific mobile network operator and the specific mobile network operator utilizes the assigned specific frequency resource exclusively to maintain a cellular network. However, the resources are wasted because the frequency resource assigned to each mobile network operator is not fully utilized except for a space-time situation in which data traffic is very high.

In order to solve such a situation, a situation that enables dynamic frequency sharing between mobile network operators may be considered. The frequency resources that have the priority right to use are assigned to each operator, but when the amount of the assigned frequency resources is small, other operators may be allowed to use the frequency resources. In the above-described scenario, the operator does not need to be assigned unnecessarily many frequencies in order to cope with a maximum traffic situation. Therefore, a system for sharing frequencies dynamically between mobile network operators will become a base technology for 6G or 5G that may efficiently operate the increasingly scarce frequency resources.

A method by which a base station of one mobile network operator dynamically shares or reuses a frequency with a base station of another mobile operator in a situation that enables dynamic frequency sharing between mobile network operators will be described. For dynamic frequency sharing between base stations of different mobile network operators, a base station of a mobile network operator may require channel information about a terminal communicating with a base station of another mobile network operator as well as a terminal communicating with the mobile network operator itself. Therefore, a method by which a base station of a mobile network operator obtains channel information about a terminal communicating with a base station of another mobile network operator will described below. In addition, a method of forming a terminal group capable of performing simultaneous transmission between base stations of mobile network operators through channel information obtained by the base stations of the mobile network operators will be described. Furthermore, a scheduling method of a base station in a dynamic frequency-sharing situation will be described.

FIG. 1 is a diagram illustrating a basic structure of a time-frequency domain, which is a radio resource domain in a wireless communication system, according to an embodiment.

In FIG. 1, a horizontal axis represents a time domain, and a vertical axis represents a frequency domain. A minimum transmission unit in the time domain is an OFDM symbol. $N_{symb}$ OFDM symbols 101 may constitute one slot 102, and two slots may constitute one subframe 103. The length of the slot 102 may be 0.5 milliseconds (ms), and the length of the subframe 103 may be 1.0 ms. A radio frame 104 is a time-domain unit including 10 subframes. A minimum transmission unit in the frequency domain is a subcarrier. An entire system transmission bandwidth may include $N_{sc}^{BW}$ subcarriers 105. A basic unit of a resource in the time-frequency domain is a resource element (RE) 106, which may be represented by an OFDM symbol index and a subcarrier index. An RB or a physical resource block (PRB) 107 may be defined by $N_{symb}$ consecutive OFDM symbols 107 in the time domain and $N_{sc}^{RB}$ consecutive subcarriers 108 in the frequency domain. Therefore, one RB 107 includes $N_{symb} \times N_{sc}^{RB}$ REs 106. In general, a minimum transmission unit of data may be an RB unit. In an LTE system, in general, $N_{symb}=7$, $N_{sc}^{RB}=12$, and $N_{sc}^{BW}$ and $N_{sc}^{RB}$ may be proportional to the system transmission bandwidth. However, these specific values may be variably controlled depending on a system.

Next, downlink control information (DCI) in the LTE and LTE-A systems will be described in detail.

Scheduling information for downlink data or uplink data in the LTE system may be transmitted from a base station to a terminal through DCI. The DCI may define several formats. DCI formats defined according to whether information is scheduling information for uplink data or scheduling information for downlink data, whether the DCI is a compact DCI having a small size of control information, whether spatial multiplexing using multiple antennas is applied, and whether the DCI is DCI for power control may be applied and operated. For example, DCI format 1, which is scheduling control information for downlink data, is configured to include at least the following control information:

Resource allocation type 0/1 flag: Notifies whether the resource allocation scheme is type 0 or type 1. Type 0 assigns resources in RB group (RBG) units by applying a bitmap scheme. In the LTE system, the basic unit of the scheduling is an RB represented by time and frequency domain resources, and the RBG includes a plurality of RBs and becomes the basic unit of the scheduling in the type 0 scheme. Type 1 allows specific RBs to be assigned within the RBG.

Resource block assignment: Notifies RBs assigned for data transmission. Resources represented according to the system bandwidth and resource assignment scheme are determined.

Modulation and Coding Scheme (MCS): Notifies a modulation scheme used for data transmission and a size of a transport block, which is data to be transmitted.

Hybrid automatic repeat request (HARQ) process number: Notifies an HARQ process number.

New data indicator: Notifies whether HARQ transmission is HARQ initial transmission or HARQ retransmission.

Redundancy version. Notifies a redundancy version of HARQ.

Transmit power control (TPC) command for physical uplink control channel (PUCCH): Notifies a transmit power control command for PUCCH.

The DCI may be transmitted via a physical downlink control channel (PDCCH) through a channel coding and modulation process.

A cyclic redundancy check (CRC) may be attached to a DCI message payload. The CRC may be scrambled by a radio network temporary identifier (RNTI) corresponding to terminal identity. Different RNTIs may be used according to the purpose of the DCI message, for example, a UE-specific data transmission, a power control command, or a random access response. That is, the RNTI is not explicitly transmitted, but is included in a CRC calculation process and then transmitted. When receiving a DCI message transmitted over a PDCCH, the terminal may check a CRC by using an assigned RNTI. When a result of checking the CRC is correct, the terminal may know that the corresponding message has been transmitted to the terminal.

Figure 2:
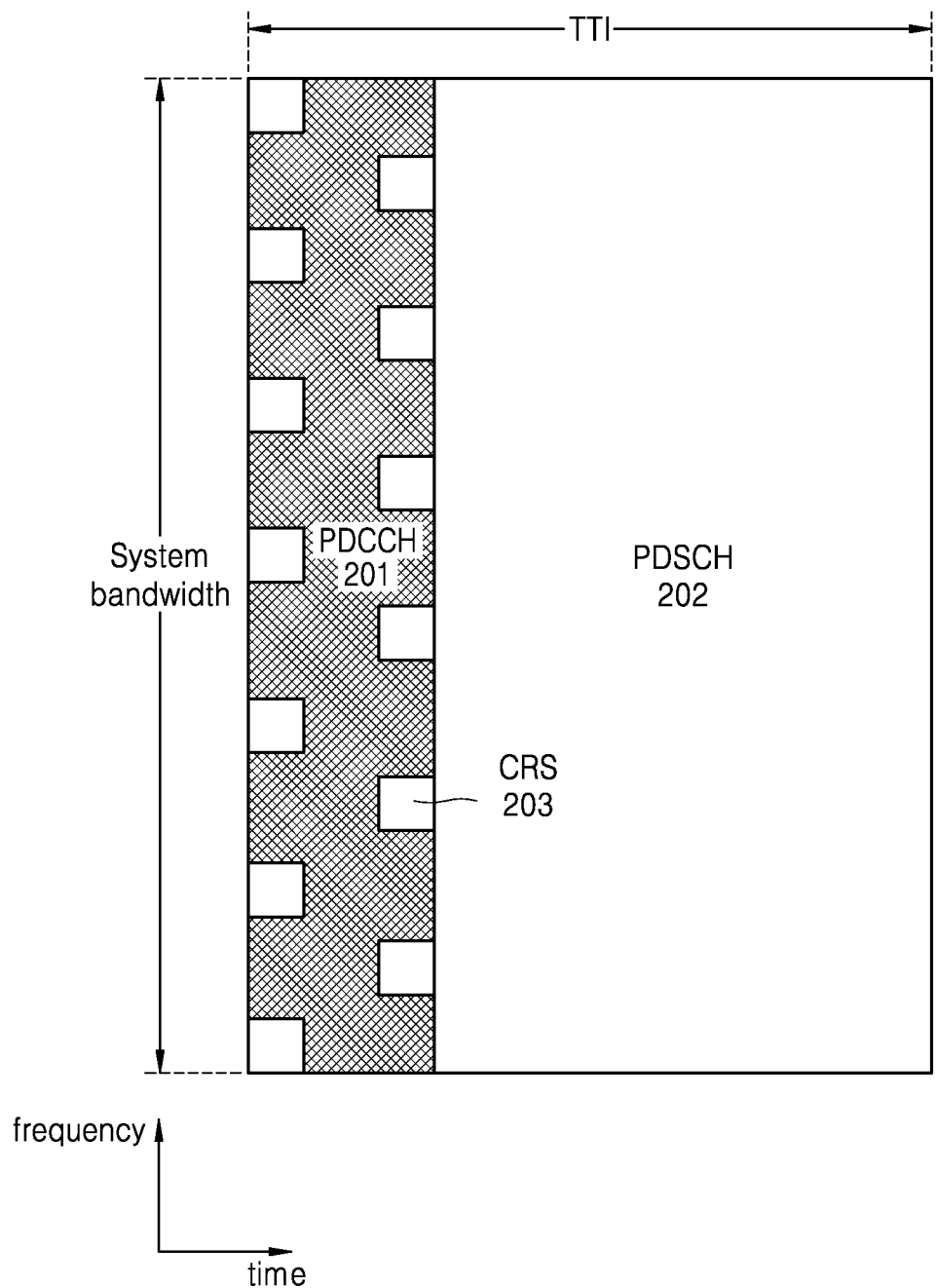
FIG. 2 is a diagram illustrating a downlink control channel in a wireless communication system, according to an embodiment.

FIG. 2 is a diagram illustrating a downlink control channel in a wireless communication system, according to an embodiment.

Referring to FIG. 2, a PDCCH 201, through which DCI of LTE is transmitted, is illustrated. Referring to FIG. 2, the PDCCH 201 is time-multiplexed with a PDSCH 202, which is a data transmission channel, and is transmitted over the entire system bandwidth. The region of the PDCCH 201 is represented by the number of OFDM symbols, and this may be indicated to the terminal as a control format indicator (CFI) transmitted through a physical control format indicator channel (PCFICH). By allocating the PDCCH 201 to the OFDM symbol located at the beginning of the subframe, the terminal may decode downlink scheduling allocation as quickly as possible. This may reduce decoding delay for downlink shared channel (DL-SCH), that is, overall downlink transmission delay. Because one PDCCH may carry one DCI message and a plurality of terminals may be simultaneously scheduled for downlink and uplink, a plurality of PDCCHs may be simultaneously transmitted in each cell. As a reference signal for decoding the PDCCH 201, a cell-specific reference signal (CRS) 203 may be used. The CRS 203 may be transmitted for every subframe over the entire band, and scrambling and resource mapping may vary depending on cell identity (ID). Because the CRS 203 is a reference signal commonly used by all terminals, UE-specific beamforming may not be used. Therefore, the multi-antenna transmission scheme for the PDCCH of LTE may be limited to open-loop transmission diversity. Of course, the disclosure is not limited to the above examples.

The number of ports of the CRS may be implicitly notified to the terminal from decoding of a physical broadcast channel (PBCH).

The resource assignment of the PDCCH 201 may be based on a control-channel element (CCE). One CCE may be nine resource element groups (REGs) and may include a total of 36 REs. The number of CCEs required for a specific PDCCH 201 may be 1, 2, 4, or 8, which may vary depending on a channel coding rate of a DCI message payload. As such, a different number of CCEs may be used to implement link adaptation of the PDCCH 201. The terminal has to detect a signal in a state in which the terminal does not know information about the PDCCH 201. In the LTE, a search space representing a set of CCEs is defined for blind decoding. The search space includes a plurality of sets at aggregation level (AL) of each CCE, and this may not be explicitly signaled and may be implicitly defined through a subframe number and a function by terminal identity. Within each subframe, the terminal may decode the PDCCH 201 for all possible resource candidates that may be created from the CCEs in the configured search space, and may process information declared to be valid for the corresponding terminal through CRC checking.

The search space may be classified into a UE-specific search space and a common search space. A certain group of terminals or all the terminals may search the common search space of the PDCCH 201 in order to receive cell-common control information such as a paging message or dynamic scheduling for system information. For example, scheduling allocation information of the DL-SCH for transmission of system information block (SIB)-1 including cell operator information may be received by searching the common search space of the PDCCH 201.

An entire PDCCH region in the LTE includes a set of CCEs in a logical region, and a search space including a set of CCEs is present. The search space may be classified into a common search space and a UE-specific search space, and the search space for the LTE PDCCH may be defined as follows.

---

The set of PDCCH candidates to monitor are defined in terms of search spaces, where a search space $S_k^{(L)}$ at aggregation level $L \in \{1, 2, 4, 8\}$ is defined by a set of PDCCH candidates. For each serving cell on which PDCCH is monitored, the CCEs corresponding to PDCCH candidate m of the search space $S_k^{(L)}$ are given by $L \{(Y_k + m') \mod \lfloor N_{CCE,k}/L \rfloor\} + i$ where $Y_k$ is defined below, $i = 0, \ldots, L-1$. For the common search space $m' = m$. For the PDCCH UE specific search space, for the serving cell on which PDCCH is monitored, if the monitoring UE is configured with carrier indicator field then $m' = m + M^{(L)} \cdot n_{CI}$ where $n_{CI}$ is the carrier indicator field value, else if the monitoring UE is not configured with carrier indicator field then $m' = m$, where $m = 0, \ldots, M^{(L)}-1$. $M^{(L)}$ is the number of PDCCH candidates to monitor in the given search space.

Note that the carrier indicator field value is the same as ServCellIndex

For the common search spaces, $Y_k$ is set to 0 for the two aggregation levels $L = 4$ and $L = 8$.

For the UE-specific search space $S_k^{(L)}$ at aggregation level L, the variable $Y_k$ is defined by $Y_k = (A \cdot Y_{k-1}) \mod D$ where $Y_{-1} = n_{RNTI} \neq 0$, $A = 39827$, $D = 65537$ and $k = \lfloor n_s/2 \rfloor$, $n_s$ is the slot number within a radio frame.

The RNTI value used for $n_{RNTI}$ is defined in subclause 7.1 in downlink and subclause 8 in uplink.

---

According to the definition of the search space for the PDCCH as described above, the UE-specific search space may not be explicitly signaled and may be implicitly defined through the subframe number and the function by terminal identity. In other words, because the UE-specific search space may change according to the subframe number, the UE-specific search space may change over time. Thus, in this manner, a problem (a blocking problem) in which a specific terminal from among a plurality of terminals is unable to use the search space due to other terminals may be solved. When all the CCEs that the terminal searches are already used by other terminals scheduled within the same subframe, and thus, a terminal is not scheduled in a corresponding subframe, such a problem may not occur in a next subframe because the search space changes over time. For example, even when the UE-specific search spaces of terminal #1 and terminal #2 partially overlap each other in a specific subframe, it may be expected that the overlap in the next subframe will be different from the above overlap because the UE-specific search space changes for each subframe.

The common search space is defined as a set of previously appointed CCEs because a certain group of terminals or all the terminals have to receive the PDCCH according to the definition of the search space for the PDCCH. In other words, the common search space may not change according to the terminal identity or the subframe number. Although the common search space is present for transmission of various system messages, the common search space may also be used to transmit control information of individual terminals. In this manner, the common search space may be used as a solution to the phenomenon that the terminal is not scheduled due to the lack of resources available in the UE-specific search space.

The search space is a set of candidate control channels including CCEs that the terminal has to attempt to decode at a given aggregation level. Because there are various aggregation levels that make one bundle from 1, 2, 4, or 8 CCEs, the terminal may have a plurality of search spaces. In the LTE PDCCH, the number of PDCCH candidates to be monitored by the terminal in the search space defined according to the aggregation level is defined by Table 1, below.

TABLE 1

| Type | Search space $S_k^{(L)}$ | | Number of PDCCH candidates $M^{(L)}$ |
| --- | --- | --- | --- |
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

According to Table 1, the UE-specific search space may support aggregation levels {1, 2, 4, 8}, and in this case, the number of PDCCH candidates may be {6, 6, 2, 2}. The common search space may support aggregation levels {4, 8}, and in this case, the number of PDCCH candidates may be {4, 2}. The common search space supports only the aggregation levels {4, 8} in order to improve coverage characteristics because a system message generally has to reach a cell edge.

The DCI that is transmitted to the common search space may be defined only for a specific DCI format, such as 0/1A/3/3A/1C, which corresponds to the purpose such as power control for a terminal group or a system message. In the common search space, a DCI format with spatial multiplexing may not be supported. The disclosure is not limited to the above example. A downlink DCI format to be decoded in the UE-specific search space may change depending on a transmission mode configured for a corresponding terminal. Because the transmission mode is configured through radio resource control (RRC) signaling, the exact subframe number indicating whether the corresponding configuration is effective for the corresponding terminal is not specified. Therefore, the terminal may be operated so as not to lose communication by always performing decoding on DCI format 1A regardless of the transmission mode.

The search space and the method of transmitting and receiving the downlink control channel and the downlink control information in the LTE and the LTE-A have been described above, and a downlink control channel in a 5G communication system that is being currently discussed will be described in more detail with reference to the accompanying drawings.

Figure 3:
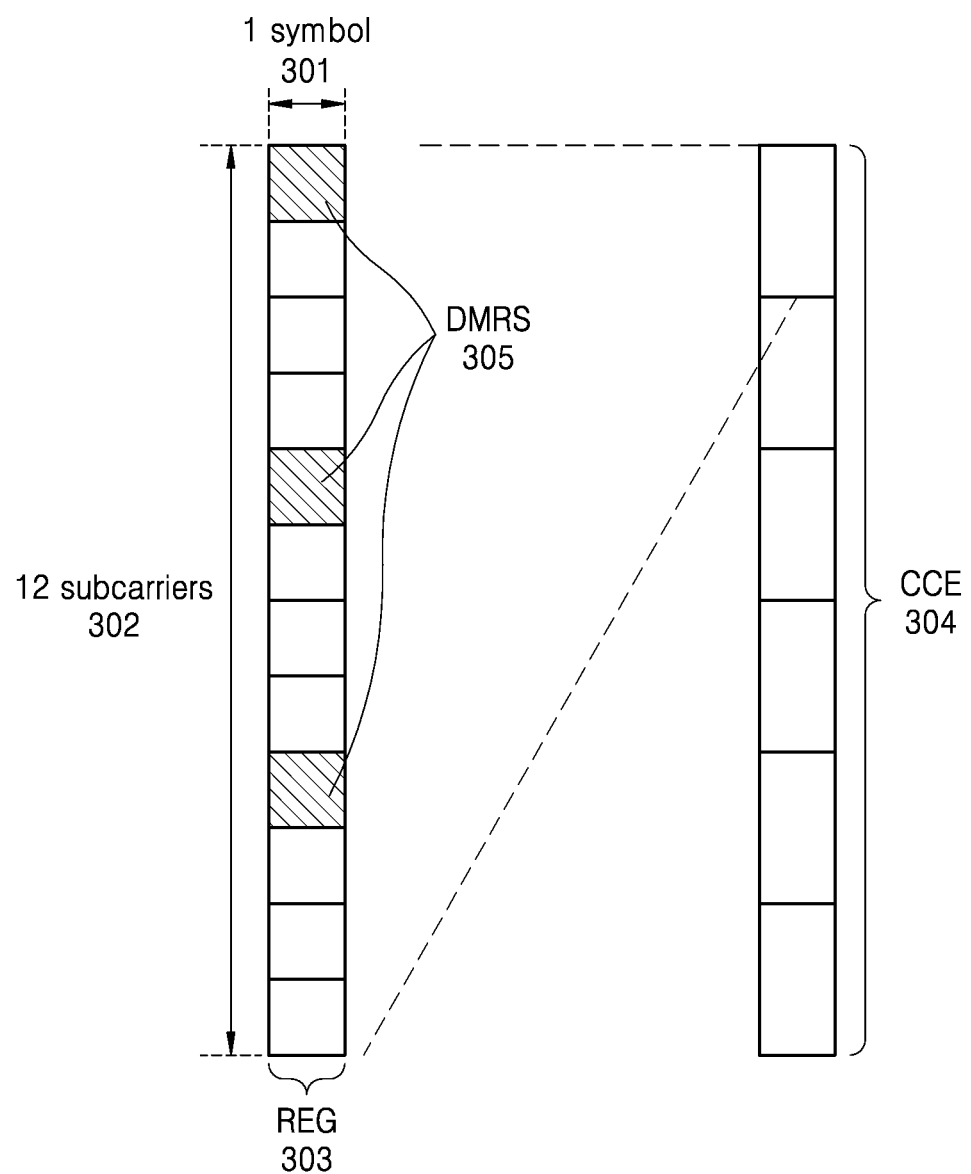
FIG. 3 is a diagram illustrating a transmission resource of a downlink control channel in a wireless communication system, according to an embodiment.

FIG. 3 is a diagram illustrating a transmission resource of a downlink control channel in a wireless communication system, according to an embodiment.

Referring to FIG. 3, the basic unit REG of time and frequency resources constituting the control channel includes one OFDM symbol 301 in the time domain, and includes 12 subcarriers 302, that is, one RB, in the frequency domain. In configuring the basic unit of the control channel, by assuming that the time-domain basic unit is one OFDM symbol 301, the data channel and the control channel may be time-multiplexed within one subframe. By placing the control channel in front of the data channel, the processing time of the user may be reduced, and thus, it is easy to satisfy delay time requirements. By configuring the frequency-domain basic unit of the control channel to one RB 302, frequency multiplexing between the control channel and the data channel may be performed more efficiently.

Control channel regions having various sizes may be configured by concatenating the REGs 303 illustrated in FIG. 3. For example, when the basic unit to which the downlink control channel is assigned in 5G is a CCE 304, one CCE 304 may include a plurality of REGs 303. In the example illustrated in FIG. 3, when the REG 303 includes 12 REs and one CCE 303 includes 6 REGs 304, one CCE 303 may include 72 REs. When the downlink control resource set is configured, the downlink control resource set may include a plurality of CCEs 304. A specific downlink control channel may be transmitted after being mapped to one or more CCEs 304 according to aggregation level AL in the control resource set. The CCEs 304 in the control resource set are distinguished by numbers. In this case, the numbers may be assigned to the CCEs 304 according to a logical mapping scheme.

The basic unit of the downlink control channel illustrated in FIG. 3, that is, the REG 303, may include both of REs to which the DCI is mapped and regions to which a demodulation reference signal (DMRS) 305, which is a reference signal for decoding the DCI, is mapped. As illustrated in FIG. 3, the DMRS 305 may be transmitted in three REs within one REG 303. For reference, because the DMRS 305 is transmitted using the same precoding as the control signal mapped in the REG 303, the terminal may decode control information even without information about which precoding is applied by the base station.

Figure 4:
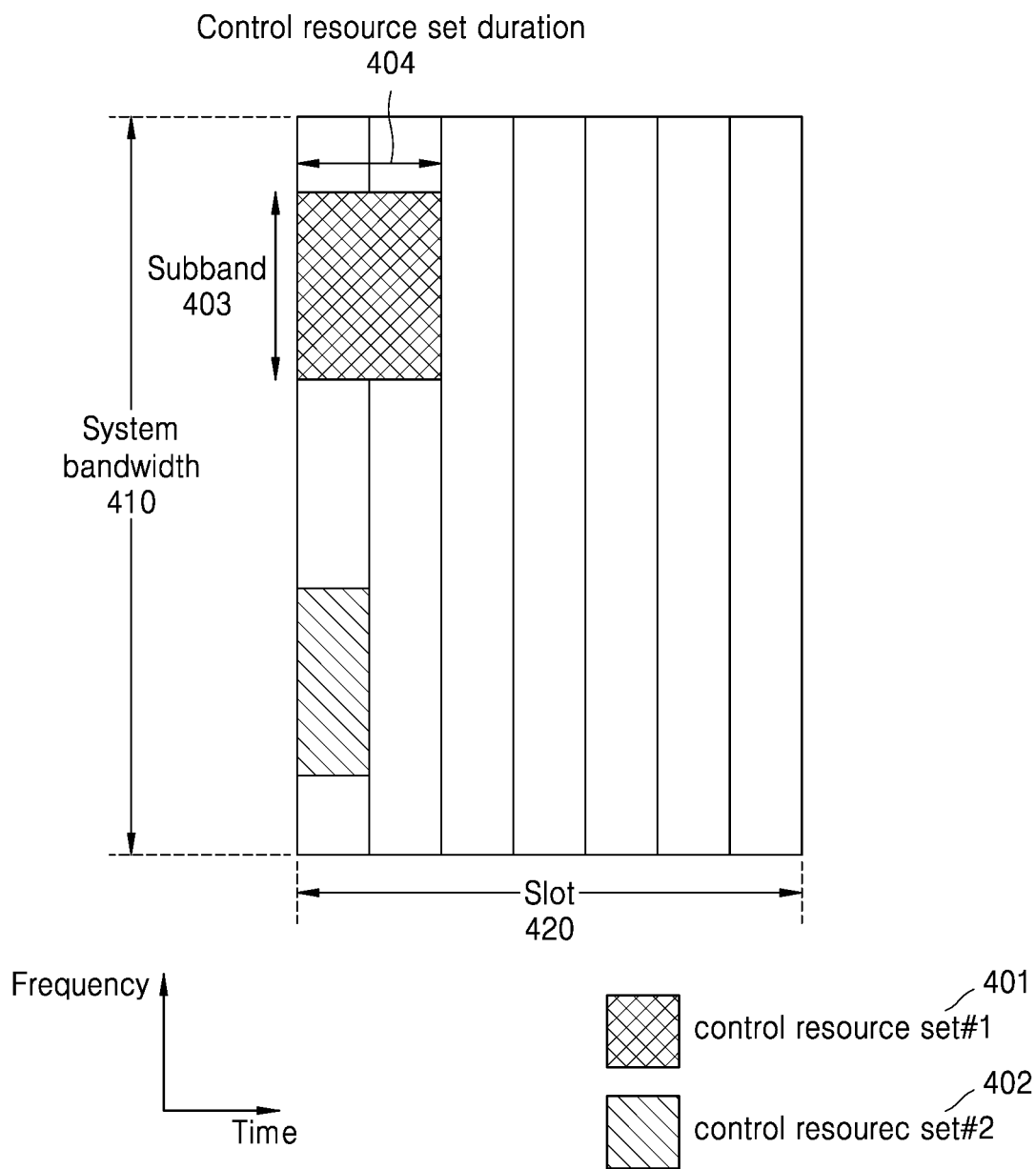
FIG. 4 is a diagram illustrating a configuration of a control resource set in a wireless communication system, according to an embodiment.

FIG. 4 is a diagram illustrating a configuration of a control resource set in a wireless communication system, according to an embodiment.

FIG. 4 illustrates an example in which control resource set #1 401 and control resource set #2 402 are configured in a system bandwidth 410 on a frequency axis and a slot 420 on a time axis (1 slot is assumed to be 7 OFDM symbols in FIG. 4). The control resource set #1 401 and the control resource set #2 402 may be configured with specific subbands 403 within an entire system bandwidth 410 on a frequency axis. The control resource set #1 401 and the control resource set #2 402 may be configured with one or more OFDM symbols in the time domain, and this may be defined as a control resource set duration 404. In the example illustrated in FIG. 4, the control resource set #1 401 is configured to the control resource set duration of two symbols, and the control resource set #2 402 is configured to the control resource set duration of one symbol.

The base station may configure the control resource set of 5G to the terminal through higher layer signaling (for example, system information, master information block (MIB), or RRC signaling). Configuring the control resource set to the terminal means providing information such as the position of the control resource set, the subband, the resource assignment of the control resource set, or the control resource set duration. For example, pieces of information, shown in Table 2, below, may be included in the provided information.

TABLE 2

Configuration information 1. Frequency-domain RB assignment information
Configuration information 2. Control resource set start symbol
Configuration information 3. Control resource set symbol duration
Configuration information 4. REG bundling size (2, 3, or 6)
Configuration information 5. Transmission mode (interleaved transmission scheme or non-interleaved transmission scheme)
Configuration information 6. DMRS configuration information (precoder granularity)
Configuration information 7. Search space type (common search space, group-common search space, UE-specific search space)
Configuration information 8. DCI format to be monitored in corresponding control resource set
Others The disclosure is not limited to the above examples. In addition to the configuration information of FIG. 2, various pieces of information necessary for transmitting the downlink control channel may be configured in the terminal.

Next, DCI in 5G will be described in detail.

In the 5G system, scheduling information about uplink data (or physical uplink shared channel (PUSCH)) or downlink data (or PDSCH) may be transmitted from the base station to the terminal through the DCI. The terminal may monitor a fallback DCI format and a non-fallback DCI format with respect to the PUSCH or the PDSCH. The fallback DCI format may include a fixed field between the base station and the terminal, and the non-fallback DCI format may include a configurable field.

The fallback DCI for scheduling the PUSCH may include pieces of information shown in Table 3, below.

TABLE 3

Identifier for DCI formats - [1] bit
Frequency domain resource assignment - [[$\log_2(N_{RB}^{UL,BWP}(N_{RB}^{UL,BWP} + 1)/2$]] bits
Time domain resource assignment - X bits
Frequency hopping flag - 1 bit.
Modulation and coding scheme - [5] bits
New data indicator - 1 bit
Redundancy version - [2] bits
HARQ process number - [4] bits
TPC command for scheduled PUSCH - [2] bits
UL/SUL indicator - 0 or 1 bit The non-fallback DCI for scheduling the PUSCH may include pieces of information shown in Table 4, below.

TABLE 4

Carrier indicator - 0 or 3 bits
Identifier for DCI formats - [1] bits

TABLE 4-continued

Bandwidth part indicator - 0, 1 or 2 bits
Frequency domain resource assignment
  For resource allocation type 0, $\lceil N_{RB}^{UL,BWP} / P \rceil$ bits
  For resource allocation type 1, $\lceil \log_2(N_{RB}^{UL,BWP} (N_{RB}^{UL,BWP} + 1) / 2) \rceil$ bits
Time domain resource assignment - 1, 2, 3, or 4 bits
VRB-to-PRB mapping - 0 or 1 bit, only for resource allocation type 1.
  0 bit if only resource allocation type 0 is configured;
  1 bit otherwise.
Frequency hopping flag - 0 or 1 bit, only for resource allocation type 1.
  0 bit if only resource allocation type 0 is configured;
  1 bit otherwise.
Modulation and coding scheme - 5 bits
New data indicator - 1 bit
Redundancy version - 2 bits as defined in section x.x of [6, TS38.214]
HARQ process number - 4 bits
1st downlink assignment index - 1 or 2 bits
  1 bit for semi-static HARQ-ACK codebook;
  2 bits for dynamic HARQ-ACK codebook with single HARQ-ACK codebook.
2nd downlink assignment index - 0 or 2 bits
  2 bits for dynamic HARQ-ACK codebook with two HARQ-ACK sub-codebooks;
  0 bit otherwise.
TPC command for scheduled PUSCH - 2 bits SRS resource indicator - $\left\lceil \log_2\left(\sum_{k=1}^{L_{max}} \binom{N_{SRS}}{k}\right) \right\rceil$ or $\lceil \log_2(N_{SRS}) \rceil$ bits $\left\lceil \log_2\left(\sum_{k=1}^{L_{max}} \binom{N_{SRS}}{k}\right) \right\rceil$ bits for non-codebook based PUSCH transmission;

$\lceil \log_2(N_{SRS}) \rceil$ bits for codebook based PUSCH transmission.
Precoding information and number of layers - up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 2 bits.
beta_offset indicator - 2 bits
DMRS sequence initialization - 0 or 1 bit
UL/SUL indicator - 0 or 1 bit The fallback DCI for scheduling PDSCH may include pieces of information shown in Table 5, below.

TABLE 5

Identifier for DCI formats - [1] bit
Frequency domain resource assignment- [[$\log_2(N_{RB}^{UL,BWP}(N_{RB}^{UL,BWP} + 1)/2$]] bits
Time domain resource assignment - X bits
VRB-to-PRB mapping - 1 bit.
Modulation and coding scheme - [5] bits
New data indicator - 1 bit
Redundancy version - [2] bits
HARQ process number - [4] bits
Downlink assignment index - [2] bits
TPC command for scheduled PUCCH - [2] bits
PUCCH resource indicator - [2] bits
PDSCH-to-HARQ feedback timing indicator - [3] bits The non-fallback DCI for scheduling the PDSCH may include pieces of information shown in Table 6, below.

TABLE 6

Carrier indicator - 0 or 3 bits
Identifier for DCI formats - [1] bits

TABLE 6-continued

Bandwidth part indicator - 0, 1 or 2 bits
Frequency domain resource assignment
For resource allocation type 0, $\lceil N_{RB}^{DL,BWP}/P \rceil$ bits
For resource allocation type 1, $\lceil \log_2(N_{RB}^{DL,BWP} (N_{RB}^{DL,BWP} + 1)/2) \rceil$ bits
Time domain resource assignment - 1, 2, 3, or 4 bits
VRB-to-PRB mapping-0 or 1 bit, only for resource allocation type 1.
0 bit if only resource allocation type 0 is configured;
1 bit otherwise:
PRB bundling size indicator - 1 bit
Rate matching indicator - 0, 1, 2 bits
ZP CSI-RS trigger - X bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 4 bits
TPC command for scheduled PUCCH-2 bits
PUCCH resource indicator
PDSCH-to-HARQ_feedback timing indicator - 3 bits
Antenna ports-up to 5 bits
Transmission configuration indication - 3 bits
SRS request - 2 bits
CBG transmission information - 0, 2, 4, 6, or 8 bits
CBG flushing out information - 0 or 1 bit
DMRS sequence initialization - 0 or 1 bit The DCI may be transmitted via a PDCCH through a channel coding and modulation process. A CRC may be attached to a DCI message payload. The CRC may be scrambled by an RNTI corresponding to terminal identity. Different RNTIs may be used according to the purpose of the DCI message, for example, a UE-specific data transmission, a power control command, or a random access response. In addition, the RNTI is not explicitly transmitted, but is included in a CRC calculation process and then transmitted. When receiving a DCI message transmitted over a PDCCH, the terminal may check a CRC using an assigned RNTI. When a result of checking the CRC is correct, the terminal may know that the corresponding message has been transmitted to the terminal.

A DCI that schedules a PDSCH for system information (SI) may be scrambled by an SI-RNTI. A DCI that schedules a PDSCH for a random access response (RAR) message may be scrambled by an RA-RNTI. A DCI that schedules a PDSCH for a paging message may be scrambled by a P-RNTI. A DCI that notifies a slot format indicator (SFI) may be scrambled by an SFI-RNTI. A DCI that notifies a transmit power control (TPC) may be scrambled by a TPC-RNTI. A DCI that schedules UE-specific PDSCH or PUSCH may be scrambled by a cell RNTI (C-RNTI).

When the specific terminal is scheduled for the data channel, that is, the PUSCH or the PDSCH, through the PDCCH, data may be transmitted and received together with the DMRS in the scheduled resource region.

Figure 5:
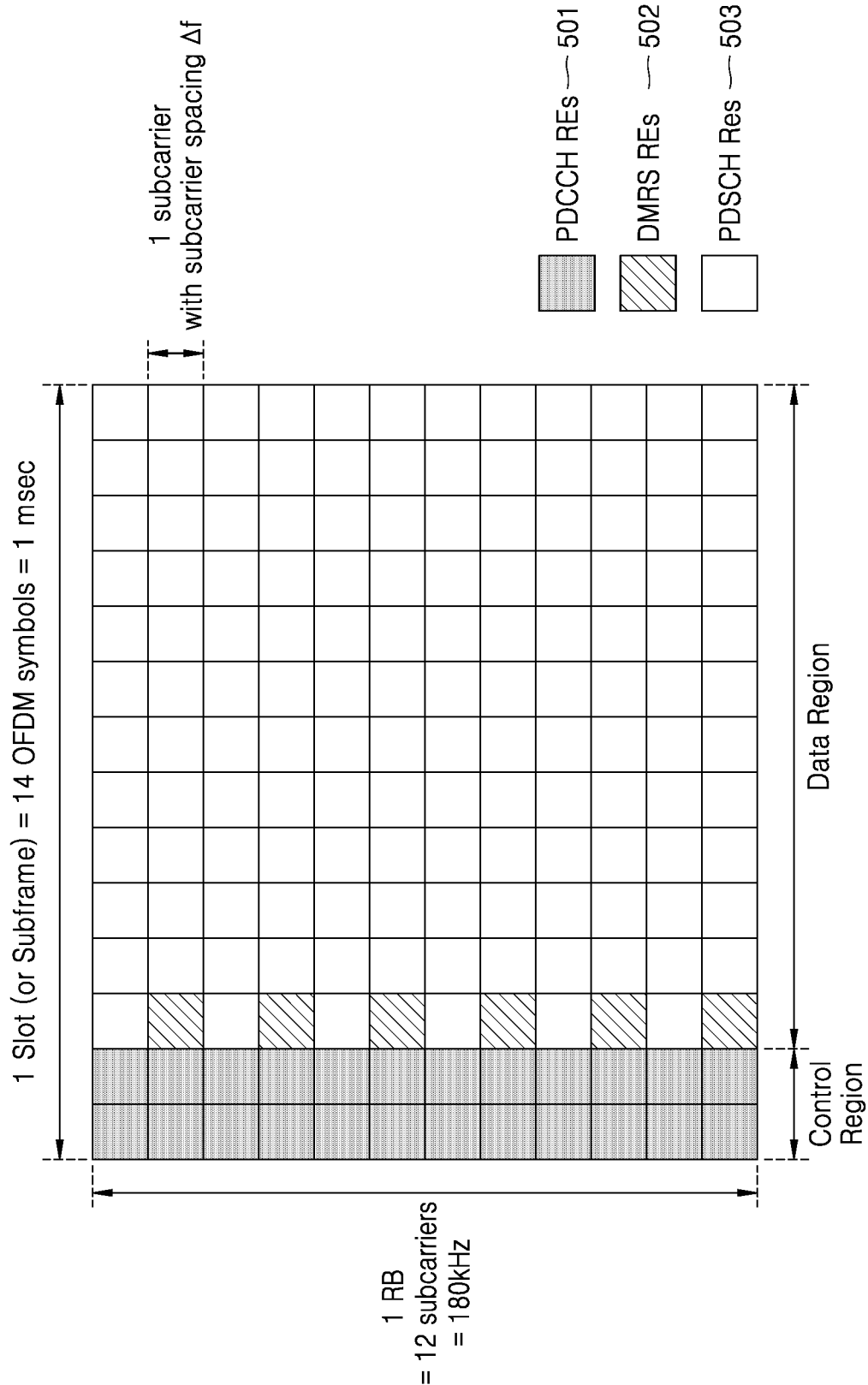
FIG. 5 is a diagram illustrating a configuration of a downlink resource block (RB) structure in a wireless communication system, according to an embodiment.

FIG. 5 is a diagram illustrating a configuration of a downlink resource block (RB) structure in a wireless communication system, according to an embodiment.

The example illustrated in FIG. 5 indicates a case in which the specific terminal uses 14 OFDM symbols as one slot (or subframe) in the downlink, the PDCCH 501 is transmitted in two initial OFDM symbols, and the DMRS 502 is transmitted in the third symbol. In the case of FIG. 5, in a specific RB in which the PDSCH is scheduled, the PDSCH 503 is transmitted while data is mapped to REs in which the DMRS is not transmitted in the third symbol and REs from the fourth symbol to the last symbol. A subcarrier spacing $\Delta f$ represented in FIG. 5 is 15 kilohertz (kHz) in the case of an LTE/LTE-A system, and one of {15, 30, 60, 120, 240, 480} kHz may be used in the case of a 5G system.

Hereinafter, when a plurality of frequency resources are present and the use priority for each frequency resource is configured differently for different base stations, a method, performed by a base station, of obtaining permission to use a frequency resource from another base station authorized to use a specific frequency resource with a higher priority and then using the frequency resource will be described. More specifically, a method, performed by different mobile network operators, of sharing frequency resources held by each mobile network operator between base stations will be described.

Figure 6:
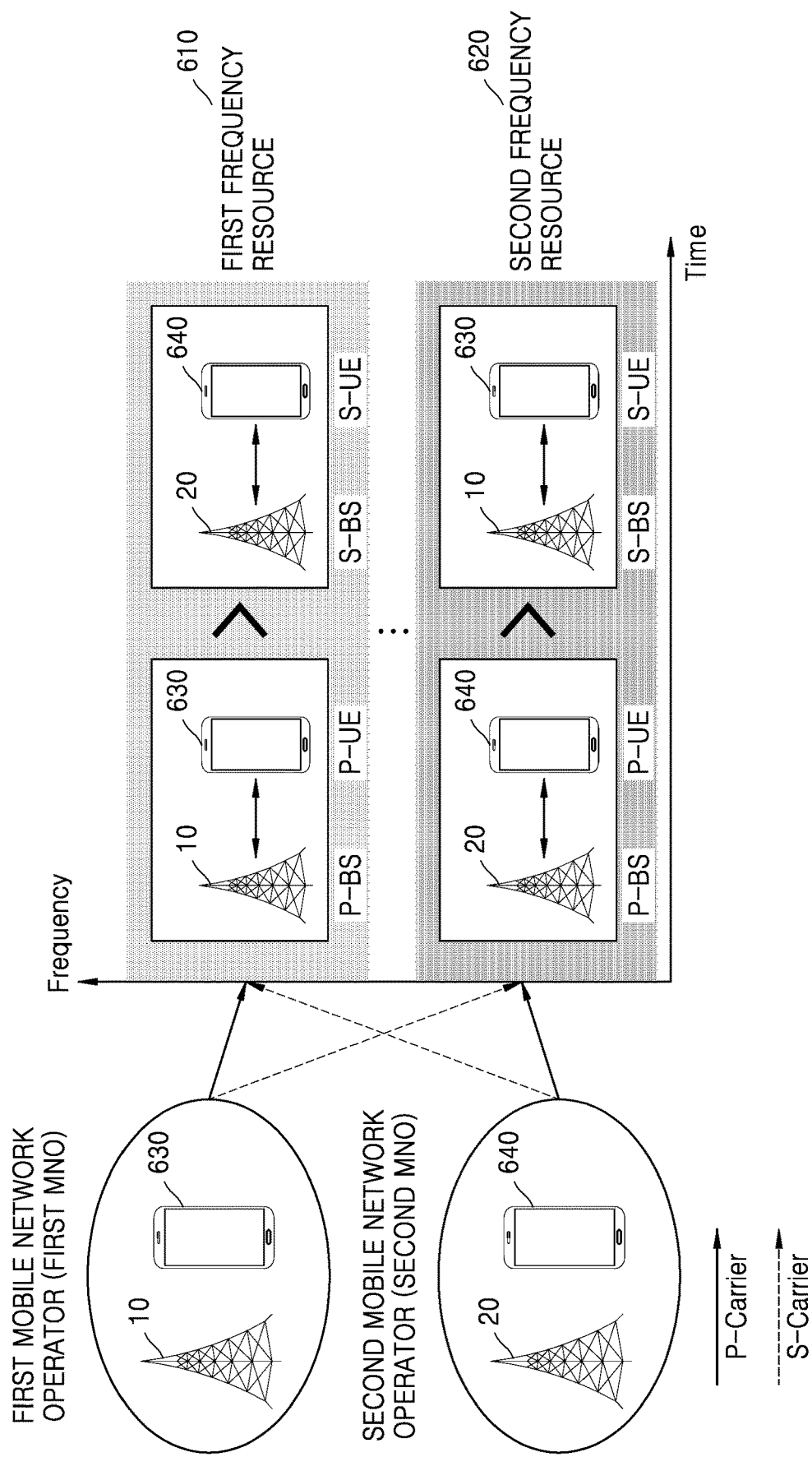
FIG. 6 is a diagram describing a method, performed by a first base station of a first mobile network operator, of sharing a frequency resource with a second base station of a second mobile network operator, according to an embodiment.

FIG. 6 is a diagram for describing a concept of a method, performed by a first base station of a first mobile network operator, of sharing a frequency resource with a second base station of a second mobile network operator, according to an embodiment.

Referring to FIG. 6, a first mobile network operator may manage a first base station 10 and may provide a service through first frequency resources 610. In addition, the first base station 10 may perform communication with a terminal using all or part of the first frequency resources 610.

A first terminal 630 may be a terminal subscribed to a communication service provided by the first mobile network operator, and a second terminal 640 may be a terminal subscribed to a communication service provided by a second mobile network operator. The first terminal 630 may receive the communication service from the first mobile network operator through the first base station 10, and the second terminal 640 may receive the communication service from the second mobile network operator through a second base station 20.

The first mobile network operator may provide the communication service to the first terminal 630 through the first frequency resource 610 that is owned or managed by the first mobile network operator. However, the first mobile network operator may provide the communication service to the first terminal 630 even through the second frequency resource 620 that is not owned or managed by the first mobile network operator. For example, the first mobile network operator may perform communication with the first terminal 630 through the first base station 10 using the second frequency resource 620 that is owned or managed by the second mobile network operator. Hereinafter, a group of terminals such as the first terminal 630 that communicates with the first base station 10 through the first frequency resource 610 will be referred to as a first terminal group. In addition, a group of terminals such as the second terminal 640 that communicates with the second base station 20 through the second frequency resource 620 will be referred to as a second terminal group.

When the first base station 10 performs communication through the first frequency resource 610, the first base station 10 may be referred to as a primary base station (P-BS) with respect to the first frequency resource 610. The first frequency resource 610 may be referred to as a primary carrier (P-carrier) with respect to the first base station 10. In addition, when the first base station 10 performs communication through the second frequency resource 620, the first base station 10 may be referred to as a secondary base station (S-BS) with respect to the second frequency resource 620. The second frequency resource 620 may be referred to as a secondary carrier (S-carrier) with respect to the first base station 10. Similarly, when the terminal performs communication with the P-BS through the P-carrier, the terminal may be referred to as a primary user equipment (P-UE), and when the terminal performs communication with the S-BS through the S-carrier, the terminal may be referred to as a secondary user equipment (S-UE).

In order for the second base station 20 to use the first frequency resource, the second base station 20 may have to negotiate with the first base station 10 to use the first frequency resource as the S-carrier. During the negotiation process, the period and conditions in which the S-carrier is usable may be negotiated. After the negotiation is completed, the second base station 20 may regard the first frequency resource as one of the frequency resources that are usable by the second base station 20.

Figure 7:
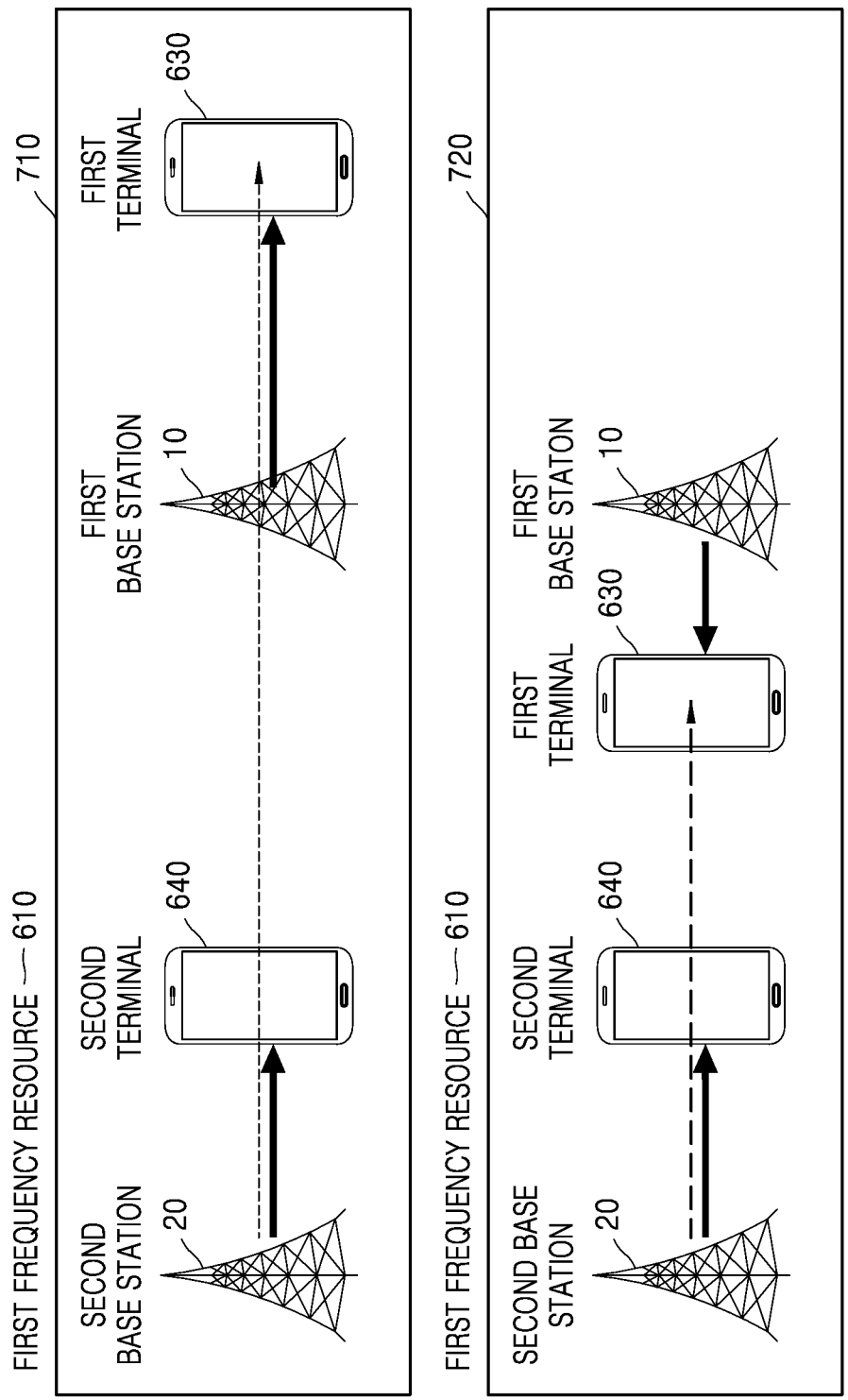
FIG. 7 is a diagram illustrating a situation in which a first base station and a second base station communicate with terminals using a shared frequency resource, according to an embodiment.

FIG. 7 is a diagram illustrating a situation in which a first base station and a second base station communicate with terminals using a shared frequency resource, according to an embodiment.

Referring to FIG. 7, a first base station 10 may perform communication with a first terminal 630 using a first frequency resource 610. In addition, a second base station 20 may perform communication with a second terminal 20 using the first frequency resource 610 shared by the first base station 10.

In this case, signals that the second base station 20 transmits to the second terminal 640 using the first frequency resource 610 may act as interference with respect to signals transmitted and received between the first base station 10 and the first terminal 630. Like a first situation 710, when the distance between the first terminal 630 and the second base station 20 is long, the strength of interference may be weak and the first base station 10 and the first terminal 630 may normally perform communication using the first frequency resource 610. However, like a second situation 720, when the distance between the first terminal 630 and the second base station 20 is short, the strength of interference may be strong and the first base station 10 and the first terminal 630 may not normally perform communication using the first frequency resource 610.

Therefore, in order to share the first frequency resource with the second base station 20, the first base station 10 needs to know measurement information about the states of channels between the second base station 20 and terminals that communicate with the first base station 10 using the first frequency resource, and how to use the measurement information to determine which frequency resource to share.

Figure 8:
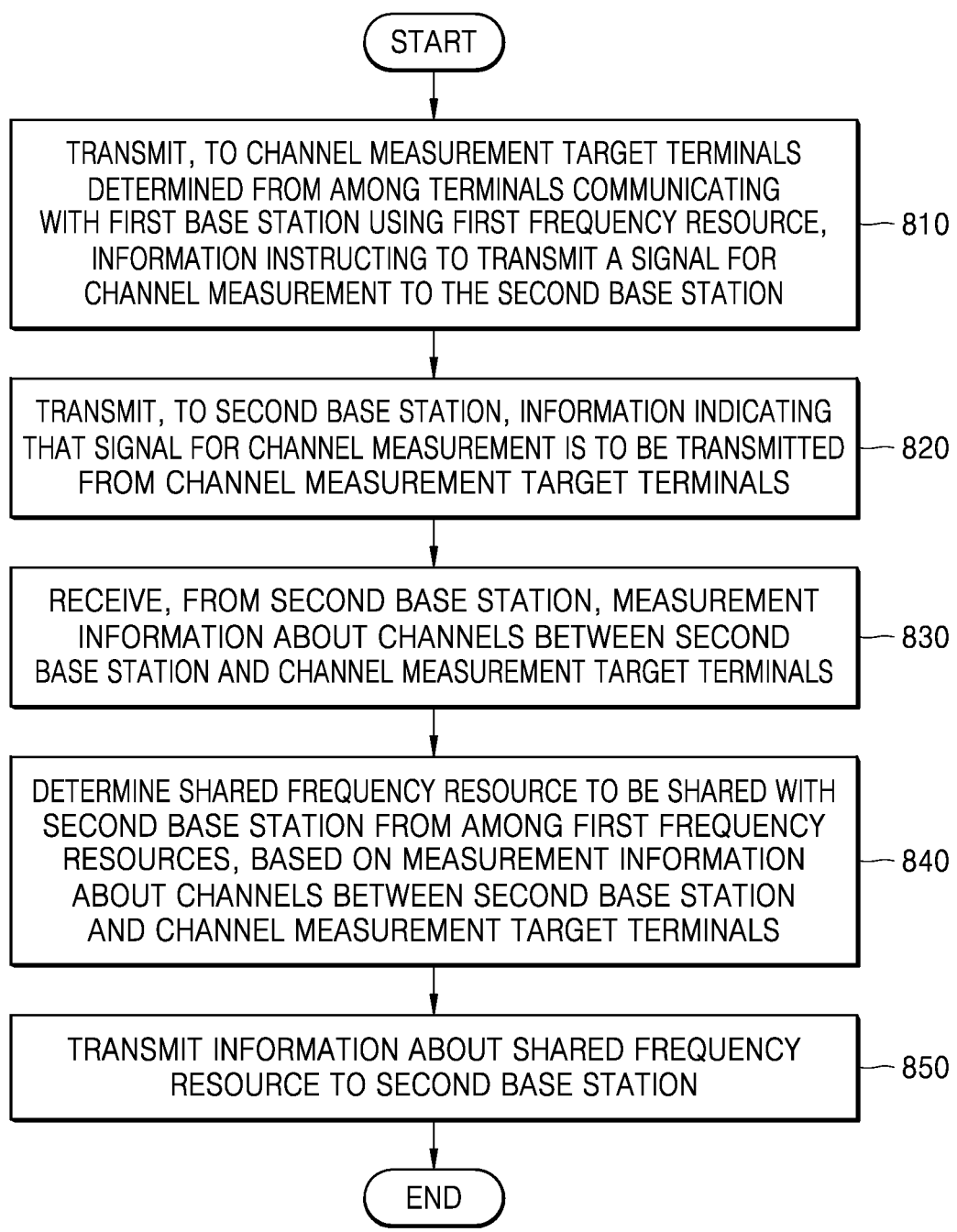
FIG. 8 is a flowchart of a method, performed by a first base station, of sharing a frequency resource with a second base station, according to an embodiment.

FIG. 8 is a flowchart of a method, performed by a first base station, of sharing a frequency resource with a second base station, according to an embodiment.

In step 810, the first base station 10 transmits, to channel measurement target terminals determined from among terminals communicating with the first base station 10 using the first frequency resource, information instructing to transmit a signal for channel measurement to the second base station 20.

In order to share the first frequency resource with the second base station 20, the first base station 10 may need to obtain measurement information about channels between the second base station 20 and terminals included in the first terminal group. To this end, the first base station 10 may determine at least one terminal to instruct to transmit the signal for channel measurement to the second base station 20. For example, the first base station 10 may determine the channel measurement target terminals to instruct to transmit a signal for channel measurement from among the terminals included in the first terminal group.

The first base station 10 may determine at least one channel measurement target terminal to instruct to transmit the signal for channel measurement from among terminals included in the first terminal group, based on positional similarity. In addition, the first base station 10 may determine a representative terminal from among the determined channel measurement target terminals and may transmit information to instruct a transmission of the signal for channel measurement only to the representative terminal. Additionally or alternatively, the first base station 10 may determine at least one channel measurement target terminal to instruct to transmit the signal for channel measurement to the second base station 20, according to the channels determined to be required to be measured for sharing the first frequency resource. Hereinafter, for convenience of description, the terminals determined to instruct to transmit the signal for channel measurement from among the terminals included in the first terminal group are referred to as channel measurement target terminals.

The information instructing to transmit the signal for channel measurement may include information about a resource for transmitting the signal for channel measurement. The information about the resource for transmitting the signal for channel measurement may be different for each channel measurement target terminal. For example, resources such as different times, frequencies, and spatial streams may be assigned to each terminal in order to transmit the signal for channel measurement.

The resource for transmitting the signal for channel measurement may include symbols of a certain time length or greater, and the information about the resource for transmitting the signal for channel measurement may include information about the symbols of the certain time length or greater. The channel measurement target terminals may not know the physical distance to the second base station 20, and signals for channel measurement may be transmitted without considering the physical distance. Therefore, timings at which the transmitted signals for channel measurement are received by the second base station 20 may not coincide with each other. In general, the signal transmitted by the terminal may include a plurality of orthogonal frequency division multiplexing access (OFDMA) symbols in a subframe that is a minimum transmission unit. When the signals for channel measurement are transmitted using a general OFDMA symbol with a short symbol time length, the timings at which the signals reach the second base station 20 do not coincide with each other in a situation where synchronization is not matched, and thus, the second base station 20 may not receive the signals for channel measurement.

Figure 10:
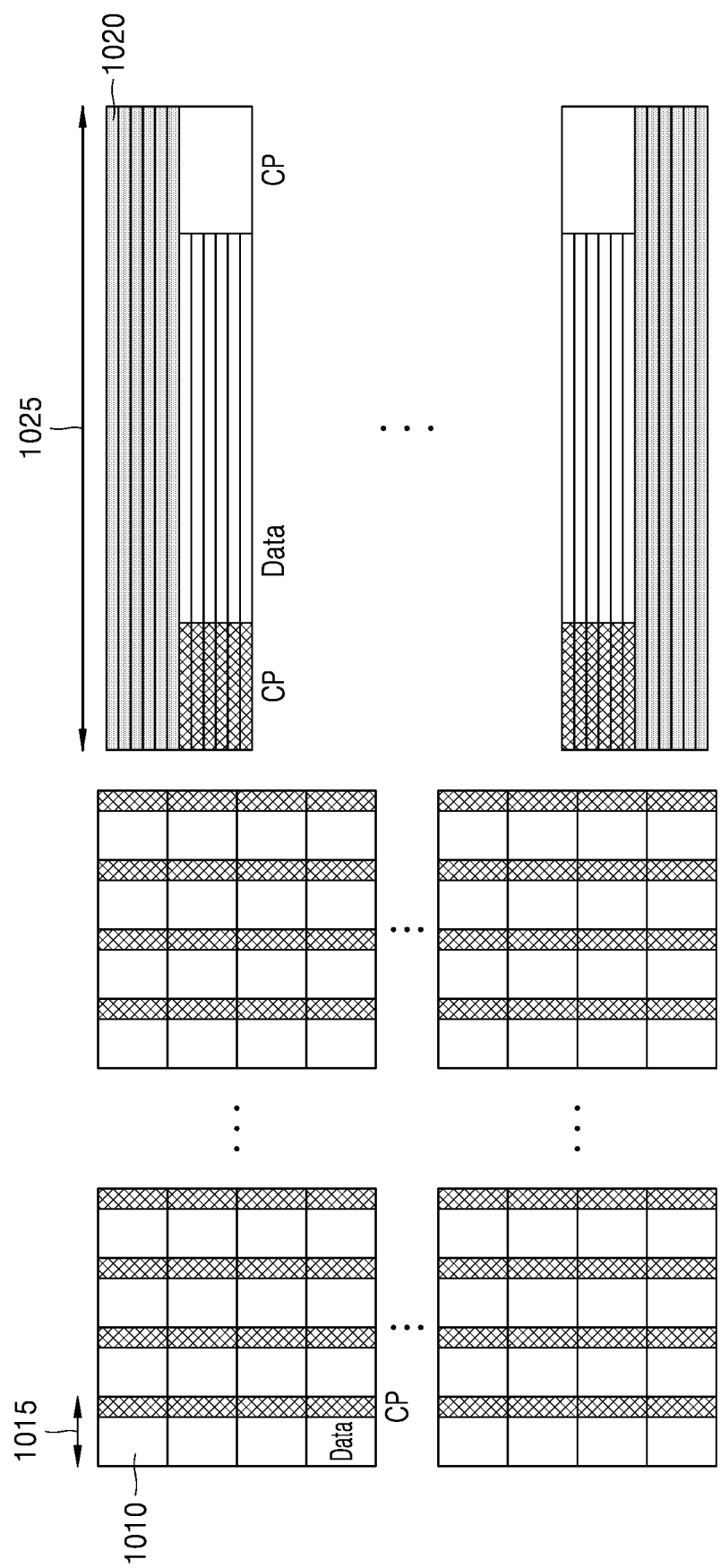
FIG. 10 is a diagram illustrating a structure of a signal for channel measurement, according to an embodiment.

FIG. 10 is a diagram illustrating a structure of a signal for channel measurement, according to an embodiment.

In order to transmit signals for channel measurement, as illustrated in FIG. 10, symbols 1020, of which a symbol time length 1025 is a certain time length or greater (that is, subcarrier spacing of a certain size or less), may need to be used instead of a symbol having a short symbol time length 1015 like a general symbol 1010. These symbols may be similar to random access channel (RACH) symbols that may be used when uplink synchronization is not matched in the LTE or NR.

The information instructing to transmit the signal for channel measurement may include information about a sequence to be used to transmit the signal for channel measurement. The channel measurement target terminals may simultaneously transmit the signal for channel measurement to the second base station 20 through the same resource. Therefore, the first base station 10 may indicate the channel measurement target terminals to transmit the signal for channel measurement based on a sequence in order to distinguish between the terminals.

The sequence to be used to transmit the signal for channel measurement may be a Zadoff-Chu sequence. Alternatively, the sequence to be used to transmit the signal for channel measurement may be a maximum length sequence (MLS) (or m-sequence).

In step 820, the first base station 10 may transmit, to the second base station 20, information indicating that the signal for channel measurement is to be transmitted from the channel measurement target terminals.

When the first base station 10 transmits information indicating that the signal for channel measurement is to be transmitted to the second base station 20 from at least one terminal (that is, channel measurement target terminals) determined from among the terminals included in the first terminal group may mean that the first base station 10 indicates the second base station 20 to receive signals for channel measurement, and based on the received signals, obtains measurement information about channels between the second base station 20 and the channel measurement target terminals, and transmits the measurement information to the first base station 10.

The information indicating that the signal for channel measurement is to be transmitted may include information about the resource for transmitting the signal for channel measurement. For example, the information about the resource for transmitting the signal for channel measurement may include information about resources such as the time, the frequency, and/or the spatial stream for transmitting the signal for channel measurement for each terminal. The information about the resource for transmitting the signal for channel measurement may be used to receive the signal for channel measurement, and may also be used to identify the channel measurement target terminals. In addition, the information about the resource for transmitting the signal for channel measurement may be used to perform channel measurement.

The information indicating that the signal for channel measurement is to be transmitted may include information about the time at which the second base station 20 performs monitoring in order to receive the signal for channel measurement. The second base station 20 may be in a state in which synchronization information of the first base station 10 has not been obtained. The first base station 10 may transmit information about how much time (Δt) is taken from a time point at which the first base station 10 transmits information indicating that the signal for channel measurement is to be transmitted until the signal for channel measurement reaches the first base station 10. The second base station 20 may perform monitoring in order to receive the signal for channel measurement in the time interval determined based on the information about Δt received from the first base station 20 and the time point at which the first base station 10 transmits the information indicating that the signal for channel measurement is to be transmitted.

In addition, the information indicating that the signal for channel measurement is to be transmitted may include information about the time (t=t1) at which the channel measurement target terminals transmit the signal for channel measurement to the second base station 20. The second base station 20 may be synchronized with the first base station 10 based on the information about the time (t=t1) at which the signal for channel measurement is transmitted.

Figure 11:
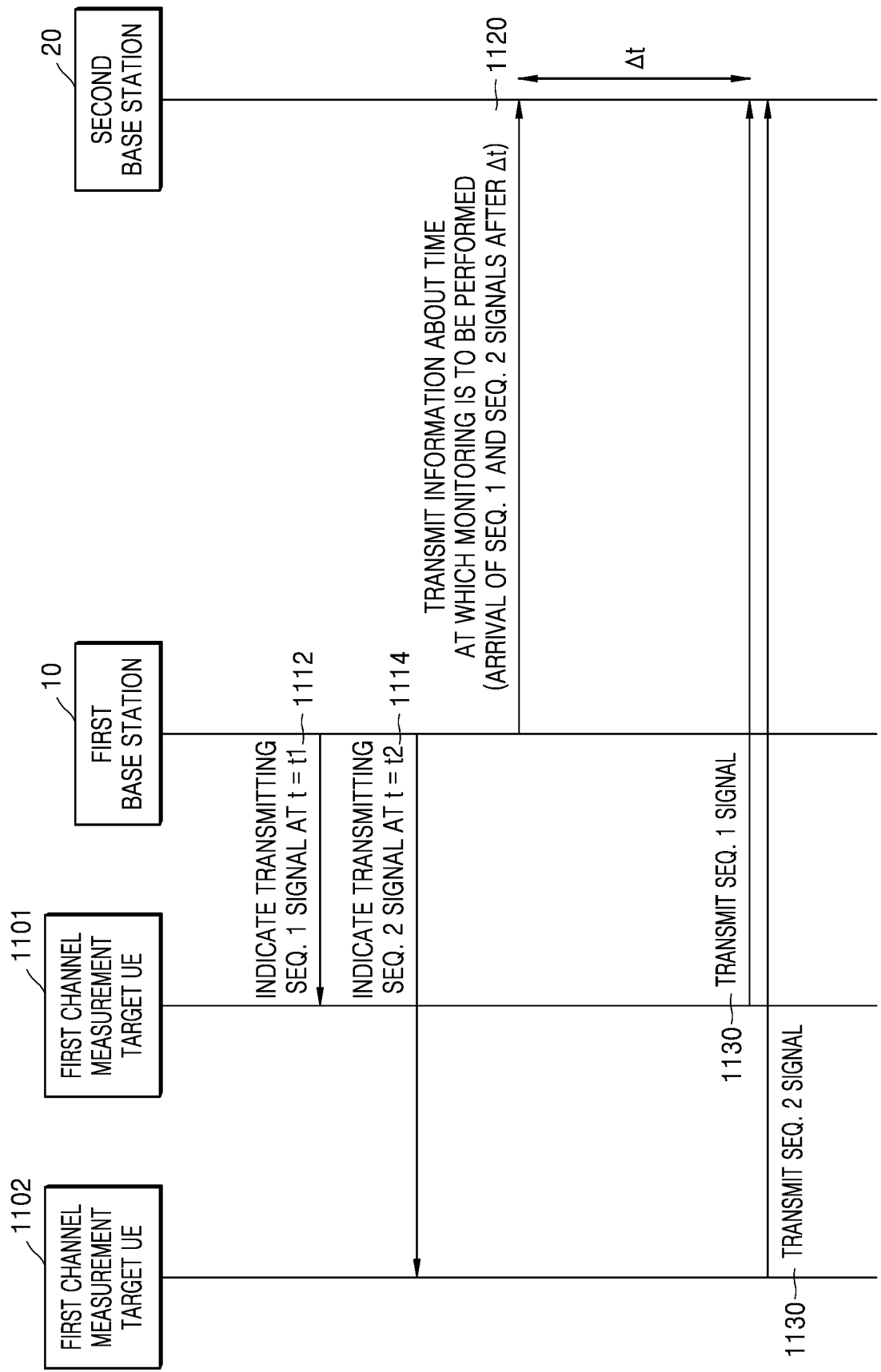
FIG. 11 is a sequence flowchart of a method of transmitting and receiving a signal for channel measurement, according to an embodiment.

FIG. 11 is a sequence flowchart of a method of transmitting and receiving a signal for channel measurement, according to an embodiment.

Referring to FIG. 11, the first base station 10 indicates to the first channel measurement target terminal 1101 to transmit a signal for channel measurement using sequences (seq. 1) at t=t1 in step 1112 and to the first channel measurement target terminal 1101 to transmit a signal for channel measurement using sequences (seq. 2) at t=t1 in step 1114. In addition, while transmitting the information indicating that the signal for channel measurement is to be transmitted to the second base station 20, the first base station 10 may transmit information about the time at which monitoring is performed in order to receive the signal for channel measurement in step 1120 (for example, including information indicating that the signal for channel measurement will arrive after Δt from the time point at which the signal for channel measurement has been transmitted). Based on the information received from the first base station 10, the second base station 20 receives the signal for channel measurement and may be synchronized with the first base station 10 in step 1130.

The information indicating that the signal for channel measurement is to be transmitted may include information about the sequence used to transmit the signal for channel measurement. The information about the sequence may be used as information for identifying the channel measurement target terminals.

The information indicating that the signal for channel measurement is to be transmitted may include information about a maximum allowable level (or strength) of interference with respect to signals between the first base station 10 and the channel measurement target terminals by a signal transmitted by the second base station 20. The first base station 10 may determine entire allowable interference levels for signals transmitted and received to and from the terminals included in the first terminal group in order to communicate with the terminals included in the first terminal group. In particular, the first base station 10 may determine the maximum allowable level of interference by the second base station 20 that shares or is scheduled to share a frequency from among the determined entire allowable interference levels. The first base station 10 may transmit, to the second base station 20, information about the maximum allowable level of interference by the second base station 20. The maximum allowable level of interference by the signal transmitted by the second base station 20 may become a reference for determining maximum power of a signal that the second base station 20 transmits using a shared frequency that is shared by the first base station 10.

The information indicating that the signal for channel measurement is to be transmitted may include information used by the second base station 20 for measuring channels between the second base station 20 and the channel measurement target terminals. For example, the information for performing channel measurement may include information about a propagation model for channel measurement, information about the locations of the channel measurement target terminals, and information about a difference between a frequency band in which the signal for channel measurement is to be transmitted and a candidate shared frequency band (for example, difference in channel characteristics due to the difference in frequency intervals and frequency bands).

The first base station 10 may add at least one of information about the resource for transmitting the signal for channel measurement, information about the time to perform monitoring in order to receive the signal for channel measurement, information about the sequence used to transmit the signal for channel measurement, information for measuring channels between the second base station 20 and the channel measurement target terminals, or any combination thereof to the information indicating that the signal for channel measurement is to be transmitted. The first base station 10 may transmit the information all at once to the second base station 20, or may transmit the information to the second base station 20 separately as individual pieces of information.

Referring again to FIG. 8, in step 830, the first base station 10 receives, from the second base station 20, measurement information about the channels between the second base station 20 and the channel measurement target terminals.

The measurement information about the channels between the second base station 20 and the channel measurement target terminals may be a response (or feedback) to the information indicating that the signal for channel measurement is to be transmitted. The measurement information about the channels between the second base station 20 and the channel measurement target terminals may be information measured by the second base station 20 based on the signals for channel measurement, which are received from the channel measurement target terminals. In order to perform channel measurement, the second base station 20 may use the information received from the first base station 10 in step 820.

The measurement information about the channels may include measurement results (for example, reception strengths) of the signals for the channel measurement, which are received from the channel measurement target terminals. In addition, the measurement information about the channels may include information about maximum transmission power (P_max(UE_ID)) that is usable by the second base station 20 in order to transmit a signal through each of the channels between the second base station 20 and the channel measurement target terminals. When the second base station 20 transmits a signal using the same frequency resource as the frequency resource used by the first base station 10 and the channel measurement target terminals, the maximum transmission power may refer to maximum transmission power that is usable by the second base station 20 within a range that does not exceed the maximum allowable level of interference with respect to the signals between the first base station 10 and the channel measurement target terminals. In addition, the information about the maximum transmission power may be measured by the second base station 20 according to the information about the maximum allowable level (or strength) of interference that is transmitted by the first base station 10 in step 820. The information about the maximum transmission power may be measured for each channel measurement target terminal (that is, for each channel), and may include information about a terminal corresponding to each channel.

Steps 810 to 830 may be performed in order to determine whether there is a situation suitable for the first base station 10 to share a first frequency resource with the second base station 20. Steps 810 to 830 may be performed temporarily or periodically, and may be performed under specific conditions. For example, when the second base station 20 requests the first base station 10 to share the first frequency resource, the first base station 10 may perform steps 810 to 830 in order to determine whether to share the first frequency resource with the second base station 20.

Steps 810 to 830 may be replaced with the following operations. The first base station 10 may use the location information of the second base station 20 and the location information of the channel measurement target terminals to determine the maximum transmission power, which is usable by the second base station 20 in order to transmit a signal through each of the channels between the second base station 20 and the channel measurement target terminals, by using methods such as a propagation model or location-based channel measurement, and may transmit information about the determined maximum transmission power to the second base station 20. Alternatively, the first base station 10 may provide location information about at least one terminal included in the first terminal group to the second base station 20, and may cause the second base station 20 to determine the above-described maximum transmission power based on the location information about the at least one terminal.

In step 840, the first base station 10 determines a shared frequency resource to be shared with the second base station 20 from among the first frequency resources, based on the measurement information about the channels between the second base station 20 and the channel measurement target terminals.

The first base station 10 may determine to share all or part of the first frequency resources with the second base station 20. That is, the first base station 10 may determine a frequency band to be shared with the second base station 20 from among the frequency bands of the first frequency resource. For example, the first base station 10 may determine to share all or part of the first frequency resources based on the measurement information about the channels between the second base station 20 and the channel measurement target terminals, which are received from the second base station 20. Hereinafter, the shared frequency resource may refer to all or part of the first frequency resources that the first base station 10 determines to share with the second base station.

The first base station 10 may determine at least one terminal, which is to communicate with the first base station 10 using the determined shared frequency resource, from among the terminals included in the first terminal group. Hereinafter, the terminal group including at least one terminal that is to communicate with the first base station 10 using the shared frequency resource is referred to as a frequency-sharing terminal group.

The first base station 10 may determine the frequency-sharing terminal group including the terminals, which are to communicate with the first base station 10 using the shared frequency resource, from among the terminals communicating with the first base station 10 using the first frequency resource. For example, the first base station 10 may determine the frequency-sharing terminal group based on the information about the locations of the terminals included in the first terminal group. The first base station 10 may determine a group of terminals, which are adjacent to each other in terms of location from among the terminals included in the first terminal group, as the frequency-sharing terminal group. In addition, the first base station 10 may determine the frequency-sharing terminal group based on the measurement information about the channels, which is received from the second base station 20 in step 830. The first base station 10 may determine, as the frequency-sharing terminal group, a group of terminals corresponding to signals having similar strengths received by the second base station 20 from among the signals for channel measurement, which are received by the second base station 20. Additionally, the first base station 10 may determine a group of terminals having similar generated traffic patterns as the frequency-sharing terminal group.

The first base station 10 may perform resource assignment (or scheduling) only within the shared frequency resource with respect to the terminals included in the determined frequency-sharing terminal group. In addition, the first base station 10 may not assign resources to other terminals within the shared frequency resource.

The first base station 10 may assign an identifier to the terminals included in the frequency-sharing terminal group. The first base station 10 may assign a common identifier to the terminals included in the frequency-sharing terminal group. The first base station 10 may perform signaling to the terminals included in the frequency-sharing terminal group based on the common identifier. Based on the common identifier, the first base station 10 may assign resources to frequency-sharing terminals, or may notify a sequence to be used upon signal transmission.

Based on the determined frequency-sharing terminal group, the first base station 10 may determine the maximum transmission power that is usable by the second base station 20 in order to transmit a signal using the shared frequency resource. For example, based on the information about the maximum transmission power (P_max(UE_ID)), received in step S830, which is usable by the second base station 20 in order to transmit a signal through each of the channels between the second base station 20 and the channel measurement target terminals, the first base station 10 may determine the maximum transmission power that is usable by the second base station 20 in order to transmit a signal using the shared frequency resource, in correspondence with each of the terminals included in the first terminal group. The first base station 10 may determine a minimum value from among the maximum transmission power values corresponding to each of the terminals included in the frequency-sharing terminal group, as the maximum transmission power that may be used in order to transmit a signal using the shared frequency resource, in correspondence with the frequency-sharing terminal group. This is done to prevent interference with a level exceeding interference tolerance from occurring in all the terminals included in the frequency-sharing terminal group.

The first base station 10 may determine a period for sharing the shared frequency resource or a condition for stopping sharing the shared frequency resource. When the determined period elapses or the condition for stopping sharing the shared frequency resource is satisfied, the sharing of the shared frequency resource between the first base station 10 and the second base station 20 may be stopped.

In step 850, based on the measurement information about the channels, the first base station 10 transmits, to the second base station 20, the information about the shared frequency resource to be shared with the second base station 20 among the first frequency resources.

When the first base station 10 transmits the information about the determined shared frequency resource to the second base station 20, the second base station 20 may be allowed to share the frequency resources.

The information about the shared frequency resource, which is transmitted from the first base station 10 to the second base station 20, may include information about the frequency band of the shared frequency resource and information about the frequency-sharing terminal group. The first base station 10 may determine the terminals to be communicated using the shared frequency resource in group units, such as the frequency-sharing terminal group, not single terminal units, and operate the shared frequency resource, so that the overhead of signaling to be transmitted and received to and from the first base station 10 may be reduced (for example, signaling for each terminal is required when the frequency resource is operated in terminal units), and user information about each terminal may be hidden. An embodiment of operating the terminals to be communicated using the shared frequency resource in group units, such as the frequency-sharing terminal group, is provided in the disclosure, but an embodiment of operating a terminal to be communicated using the shared frequency resource in individual terminal units may also be included.

In addition, the information about the shared frequency resource may include information about the maximum transmission power that is usable by the second base station 20 in order to transmit a signal using the shared frequency resource. Additionally, the information about the shared frequency resource may include a period for sharing the shared frequency resource or a condition for stopping sharing the shared frequency resource.

Figure 9:
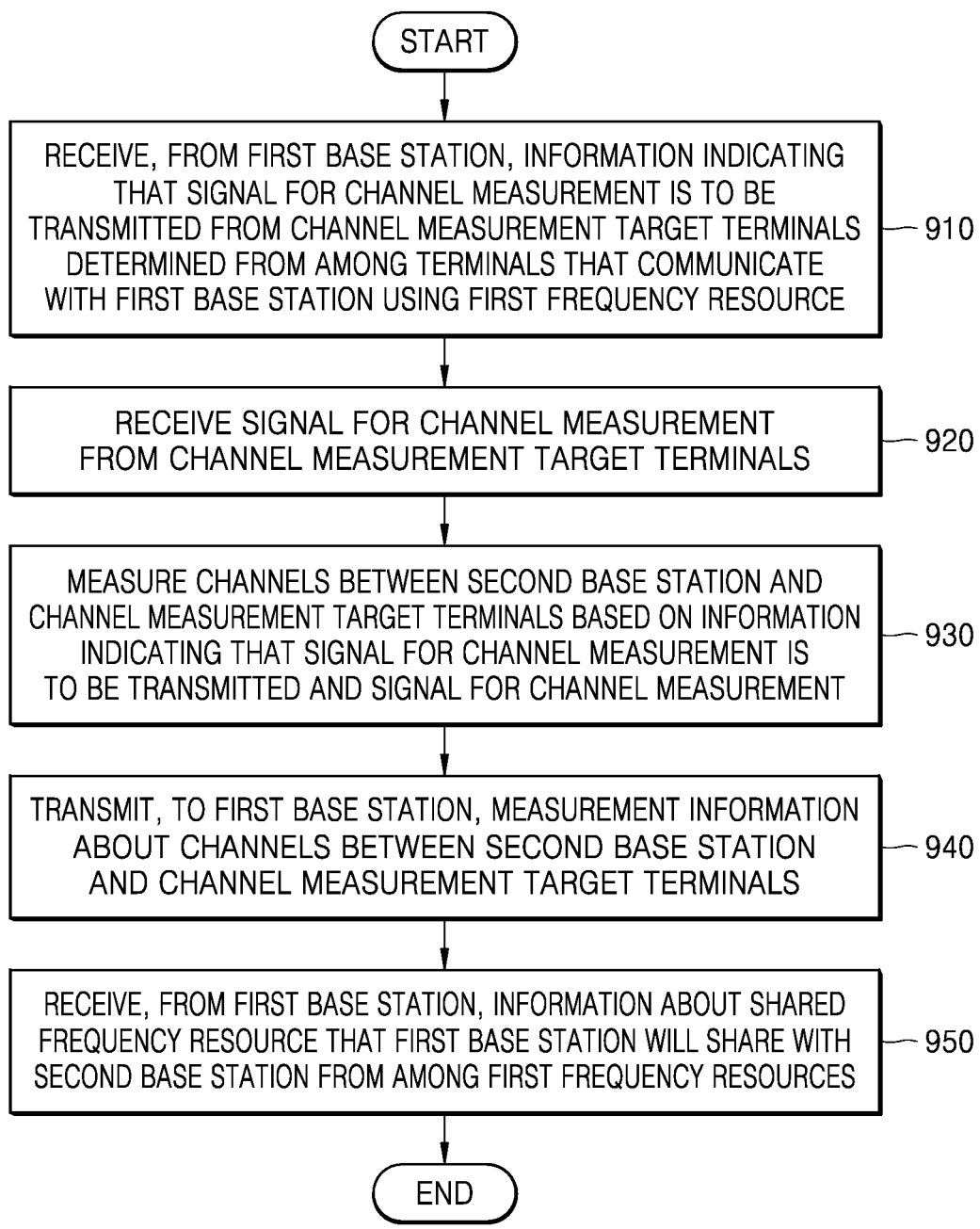
FIG. 9 is a flowchart of a method, performed by a second base station, of sharing a frequency resource with a first base station, according to an embodiment.

FIG. 9 is a flowchart of a method, performed by the second base station 20, of sharing a frequency resource with the first base station 10, according to an embodiment. In the description of FIG. 9, contents overlapping the description of FIG. 8 will be briefly described.

In step 910, the second base station 20 receives, from the first base station 10, information indicating that a signal for channel measurement is to be transmitted from channel measurement target terminals determined from among the terminals that communicate with the first base station 10 using the first frequency resource (that is, the terminals included in the first terminal group). Step 910 may correspond to step 820 of FIG. 8.

The information indicating that the signal for channel measurement is to be transmitted may include at least one of information about a resource for transmitting the signal for channel measurement or information about a sequence to be used to transmit the signal for channel measurement. The information about the resource for transmitting the signal for channel measurement may include information indicating that the signal for channel measurement includes symbols of a certain time length or greater, and information indicating that the sequence to be used to transmit the signal for channel measurement is a Zadoff-Chew sequence.

The information indicating that the signal for channel measurement is to be transmitted may include information about the time at which the second base station 20 performs monitoring in order to receive the signal for channel measurement.

The information indicating that the signal for channel measurement is to be transmitted may include information about a maximum allowable level (or strength) of interference with respect to signals between the first base station 10 and the channel measurement target terminals by a signal transmitted by the second base station 20.

In step 920, the second base station 20 receives the signal for channel measurement from the channel measurement target terminals.

The second base station 20 may monitor signals based on the information about the resource for transmitting the signal for channel measurement and the information about the time at which the monitoring is to be performed in order to receive the signal for channel measurement. For example, the second base station 20 may compare signals received at the time (or a time interval window) for performing monitoring, which is notified by the first base station 10, with the information about the resource for transmitting the signal for channel measurement. In this manner, the second base station 20 may obtain the signal for channel measurement from among the monitored signals. In addition, the second base station 20 may be synchronized with the first base station 10 based on the information about the time for performing monitoring and the received signal for channel measurement.

Referring again to FIG. 11, the second base station 20 may monitor signals based on the information about the time at which monitoring is to be performed in order to receive the signal for channel measurement, which is notified by the second base station 20 (for example, information indicating that the signal for channel measurement will arrive after Δt from the time point at which the signal for channel measurement is transmitted may be included). The second base station 20 obtains signals for channel measurement, which is transmitted by the first channel measurement target terminals 1101 and 1102, through monitoring in step 1130. In addition, based on the information received from the first base station 10, the second base station 20 may receive the signal for channel measurement and may be synchronized with the first base station 10.

In step 930, the second base station 20 may measure channels between the second base station 20 and the channel measurement target terminals based on the information indicating that the signal for channel measurement is to be transmitted and the signal for channel measurement.

The second base station 20 may measure the received signal strengths of the signals for channel measurement, which are received from the channel measurement target terminals. In addition, the second base station 20 may determine the maximum transmission power (P_max (UE_ID)), which is usable by the second base station 20 in order to transmit a signal through each of the channel, according to the information about the maximum allowable level of interference with respect to signals between the first base station 10 and the channel measurement target terminals, which is received from the first base station 10. The second base station 20 may measure the channels for each channel measurement target terminal.

In step 940, the second base station 20 transmits, to the first base station 10, measurement information about the channels between the second base station 20 and the channel measurement target terminals. Step 940 may correspond to step 830 of FIG. 8.

The second base station 20 may transmit, to the first base station 10, the measurement information about the channels between the second base station 20 and the channel measurement target terminals as a response (or feedback) to the information indicating that the signal for channel measurement transmitted by the first base station 10 is to be transmitted. The measurement information about the channels may include measurement results (for example, received signal strengths) of the signals for channel measurement, which are received from the channel measurement target terminals. Specifically, the measurement information about the channels may include information about the maximum transmission power (P_max(UE_ID)) that is usable by the second base station 20 in order to transmit a signal through each of the channels between the second base station 20 and the channel measurement target terminals.

Steps 910 to 940 may be performed in order to determine whether it is a situation suitable for the first base station 10 to share a first frequency resource with the second base station 20. Steps 910 to 940 may be performed temporarily or periodically, and may be performed under specific conditions. For example, steps 910 to 940 may be performed after the second base station 20 requests the first base station 10 to share the first frequency resource.

In step 950, the second base station 20 receives, from the first base station 10, information about the shared frequency resource that the first base station 10 will share with the second base station 20 from among the first frequency resources. Step 950 may correspond to step 850 of FIG. 8.

The receiving by the second base station 20 of the information about the determined shared frequency resource from the first base station 10, may mean that the second base station 20 gets permission to share the frequency resource from the first base station 10.

The information about the shared frequency resource may include at least one of information about the frequency band of the shared frequency resource, information about the frequency-sharing terminal group, or information about the maximum transmission power that is usable by the second base station 20 in order to transmit a signal using the shared frequency resource. In addition, the information about the shared frequency resource may include a period for sharing the shared frequency resource or a condition for stopping sharing the shared frequency resource.

The frequency-sharing terminal group may include terminals that will communicate with the first base station 10 using the shared frequency resource from among terminals communicating with the first base station 10 using the first frequency resource. The frequency-sharing terminal group may be determined by the first base station 10 based on at least one of measurement information about channels or information about locations of terminals communicating with the first base station 10 using the first frequency resource. In addition, the maximum transmission power that is usable by the second base station 20 in order to transmit a signal using the shared frequency resource may be determined by the first base station 10 based on the frequency-sharing terminal group.

The second base station 20 may use the shared frequency resource to communicate with at least one of the terminals included in the second terminal group. For example, the second base station 20 may determine terminals to schedule the shared frequency resource from the second terminal group, based on the information about the shared frequency resource. Based on the information about the maximum transmission power that is usable by the second base station 20 in order to transmit a signal using the shared frequency resource, the second base station 20 may determine terminals to schedule the shared frequency resource from the second terminal group and transmission power to be used to transmit a signal through the shared frequency resource. For example, even when the second base station 20 transmits a signal with the maximum transmission power that is usable by the second base station 20, terminals that do not receive a signal may be excluded from the terminals to schedule the shared frequency resource.

The second base station 20 may schedule the shared frequency resource to the terminals based on the information about the frequency band of the shared frequency resource. In addition, the second base station 20 may schedule the shared frequency resource based on a period for sharing the shared frequency resource, which is configured by the first base station 10 and a condition for stopping sharing the shared frequency resource.

According to the above-described embodiments of the disclosure, the first base station 10 may share all or part of the first frequency resources with the second base station 20 within a range in which interference with the terminals included in the first terminal group does not occur. In addition, the first base station 10 previously provides the information about the frequency-sharing terminal group communicating with the second base station 20 using the shared frequency resource while sharing the frequency resource with the second base station 20, so that the second base station 20 may freely schedule the shared frequency resource based on the information about frequency-sharing terminal group.

Figure 12:
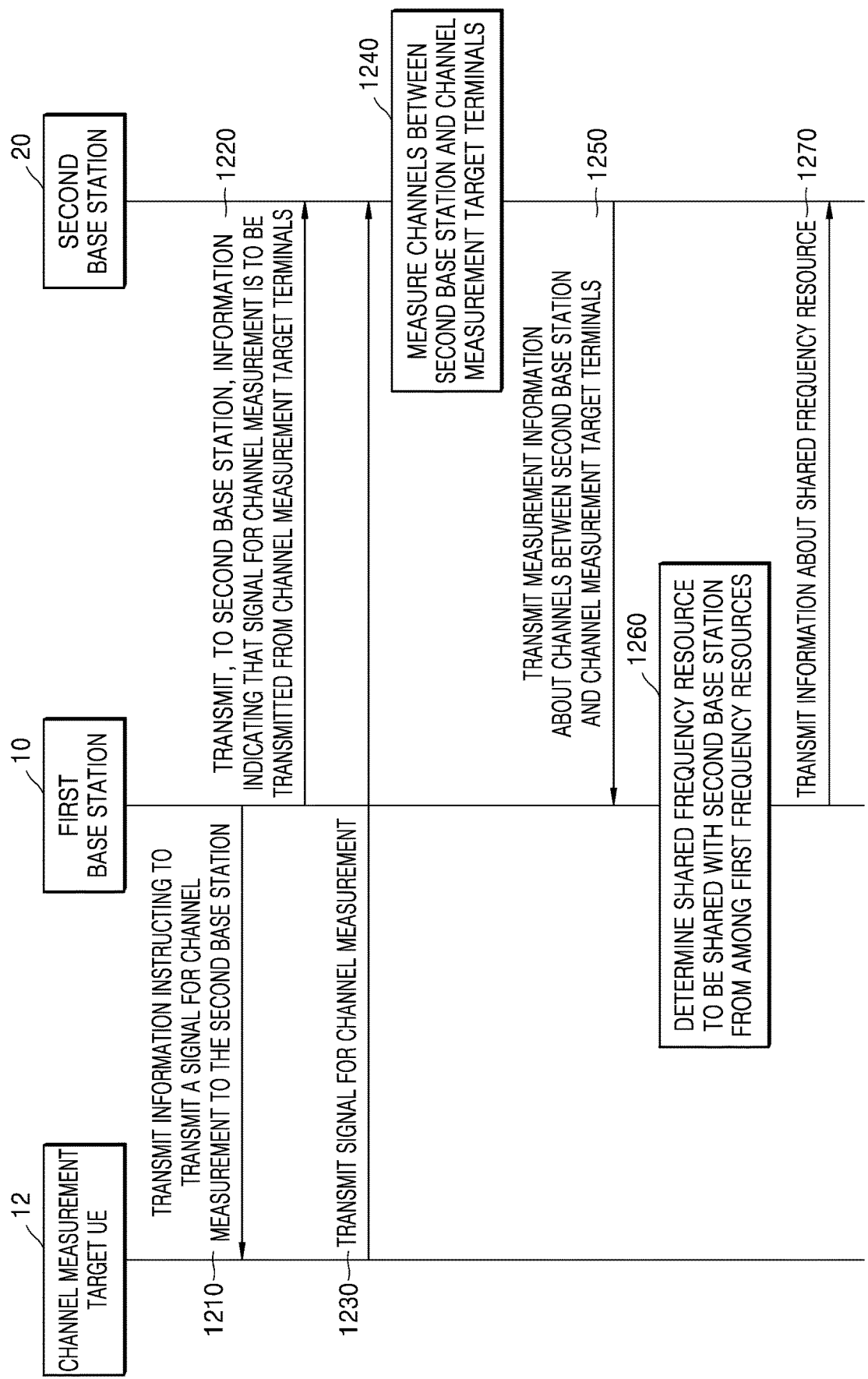
FIG. 12 is a sequence flowchart of a method of sharing a frequency resource, according to an embodiment.

FIG. 12 is a sequence flowchart of a method of sharing a frequency resource, according to an embodiment. In the description of FIG. 12, contents overlapping the description of FIGS. 8 and 9 will be briefly described.

In step 1210, the first base station 10 transmits, to the channel measurement target terminals 12, information instructing to transmit a signal for channel measurement to the second base station 20.

In step 1220, the first base station 10 transmits, to the second base station 20, information indicating that the signal for channel measurement is to be transmitted from the channel measurement target terminals.

In step 1230, the channel measurement target terminals 12 transmits the signal for channel measurement to the second base station 20. The second base station 20 may receive the signal for channel measurement, which is transmitted by the channel measurement target terminals 12, based on the information indicating that the signal for channel measurement is to be transmitted.

In step 1240, the second base station 20 measures channels between the second base station 20 and the channel measurement target terminals 12.

In step 1250, the second base station 20 transmits, to the first base station 10, measurement information about the channels between the second base station 20 and the channel measurement target terminals.

In step 1260, the first base station 10 determines the shared frequency resource to be shared with the second base station 20 from among the first frequency resources.

The shared frequency resource may be determined based on the measurement information about the channels.

In step 1270, the first base station 10 transmits the information about the shared frequency resource to the second base station 20.

Figure 13:
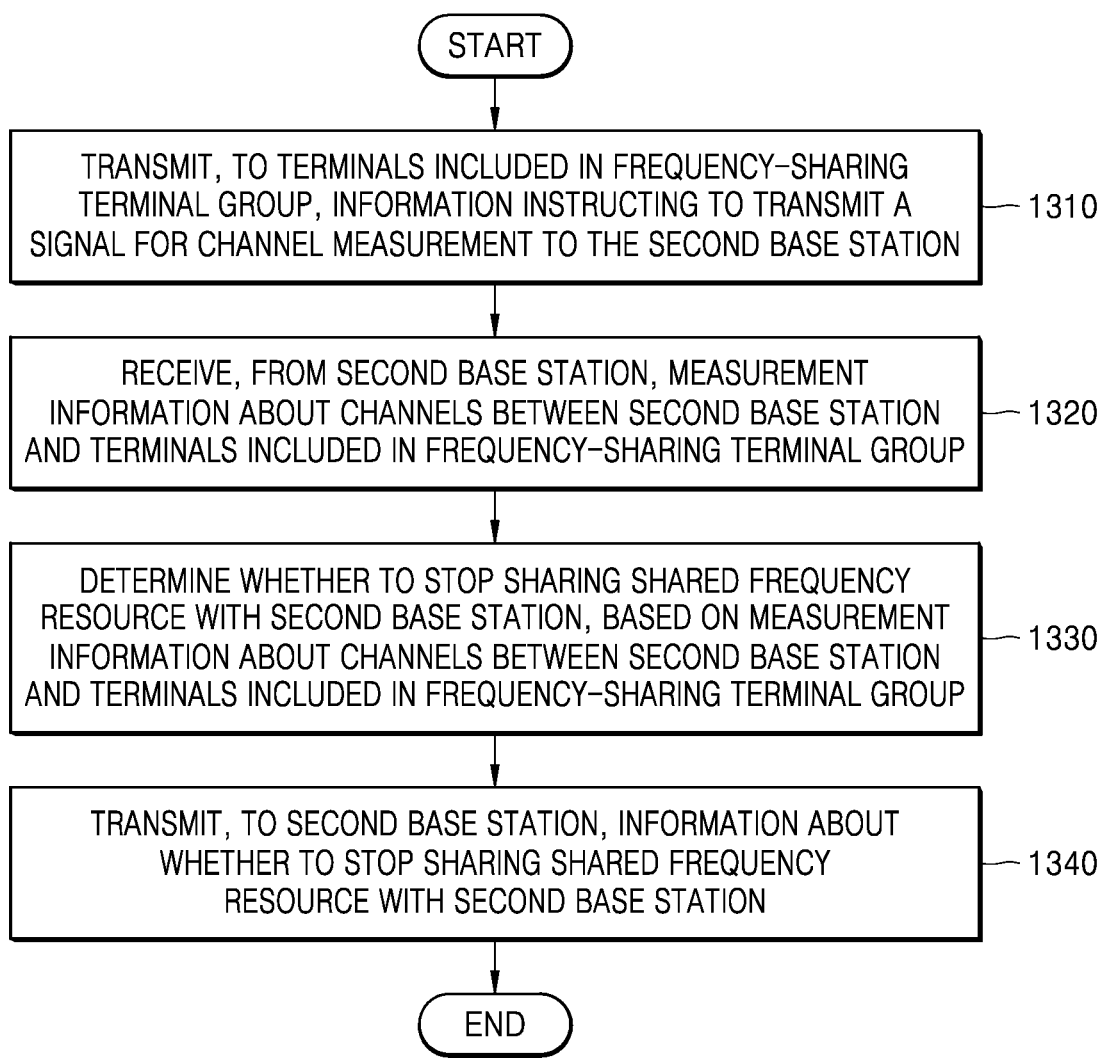
FIG. 13 is a flowchart of a method, performed by a first base station, of determining whether to stop sharing a shared frequency resource, according to an embodiment.

FIG. 13 is a flowchart of a method, performed by the first base station 10, of determining whether to stop sharing a shared frequency resource, according to an embodiment. The first base station 10 may perform the steps of FIG. 13 after the steps of FIG. 8.

In step 1310, the first base station 10 transmits, to the terminals included in the frequency-sharing terminal group, information instructing to transmit a signal for channel measurement to the second base station 20.

In order to determine whether to continue to share the first frequency resource with the second base station 20, the first base station 10 is required to monitor the state change of the channels between the second base station 20 and the terminals included in the frequency-sharing terminal group, and is required to obtain the measurement information about the channels. To this end, the first base station 10 may transmit, to the terminals (or to the representative UE) included in the frequency-sharing terminal group, information indicating periodically (or temporarily) transmitting a signal for channel measurement to the second base station 20.

According to an embodiment, the information indicating that the signal for channel measurement is to be transmitted may include information about a resource for transmitting the signal for channel measurement, information about a sequence to be used to transmit the signal for channel measurement, and the like.

In step 1320, the first base station 10 receives, from the second base station 20, measurement information about the channels between the second base station 20 and the terminals included in the frequency-sharing terminal group.

The measurement information about the channels between the second base station 20 and the terminals included in the frequency-sharing terminal group may include measurement results (for example, reception strengths) of the signals for channel measurement, which are received from the channel measurement target terminals. In addition, the measurement information about the channels may include information about the maximum transmission power that is usable by the second base station 20 in order to transmit a signal through each of the channels between the second base station 20 and the terminals included in the frequency-sharing terminal group, according to the information about the maximum allowable level of interference with respect to signals between the first base station 10 and the terminals included in the frequency-sharing terminal group.

In step 1330, the first base station 10 determines whether to stop sharing the shared frequency resource with the second base station 20, based on the measurement information about the channels between the second base station 20 and the terminals included in the frequency-sharing terminal group.

Based on the measurement information about the channels between the second base station 20 and the terminals included in the frequency-sharing terminal group, the first base station 10 may measure an interference level for the frequency-sharing terminal group by signal transmission of the second base station 20 using the shared frequency. The first base station 10 may compare the measured interference level with the maximum allowable level (or strength) of interference with respect to the signals between the first base station 10 and the channel measurement target terminals. When the measured interference level exceeds the maximum allowable level of interference, the first base station 10 may determine to stop sharing the shared frequency resource with the second base station 20.

Based on the measurement information about the channels between the second base station 20 and the terminals included in the frequency-sharing terminal group, the first base station 10 may determine to change the maximum transmission power that is usable by the second base station 20 in order to transmit a signal using the shared frequency resource.

In step 1340, the first base station 10 transmits, to the second base station 20, the information about whether to stop sharing the shared frequency resource with the second base station 20.

The first base station 10 may transmit, to the second base station 20, information indicating that the sharing of the shared frequency resource will be stopped, information indicating that the sharing of the shared frequency resource will be maintained, and information indicating that the maximum transmission power that is usable by the second base station 20 in order to transmit a signal using the shared frequency resource has changed.

Although an embodiment of determining whether to stop sharing the frequency resource through the channel measurement has been described with reference to FIG. 13, the first base station 10 may stop sharing the shared frequency resource in response to the request from the second base station 20. For example, when the amount of traffic of the second terminal group decreases and there is no need to use the shared frequency resource, when the first base station 10 provides a notification that it is necessary to use more than the maximum transmission power in order to transmit a signal using the shared frequency resource, the second base station 20 may request the first base station 10 to stop sharing the frequency resource. In addition, even when the period for sharing the shared frequency resource or the condition for stopping sharing the shared frequency resource, which have been described with reference to FIGS. 8 and 9, are satisfied, the first base station 10 may stop sharing the frequency resource.

Figure 14:
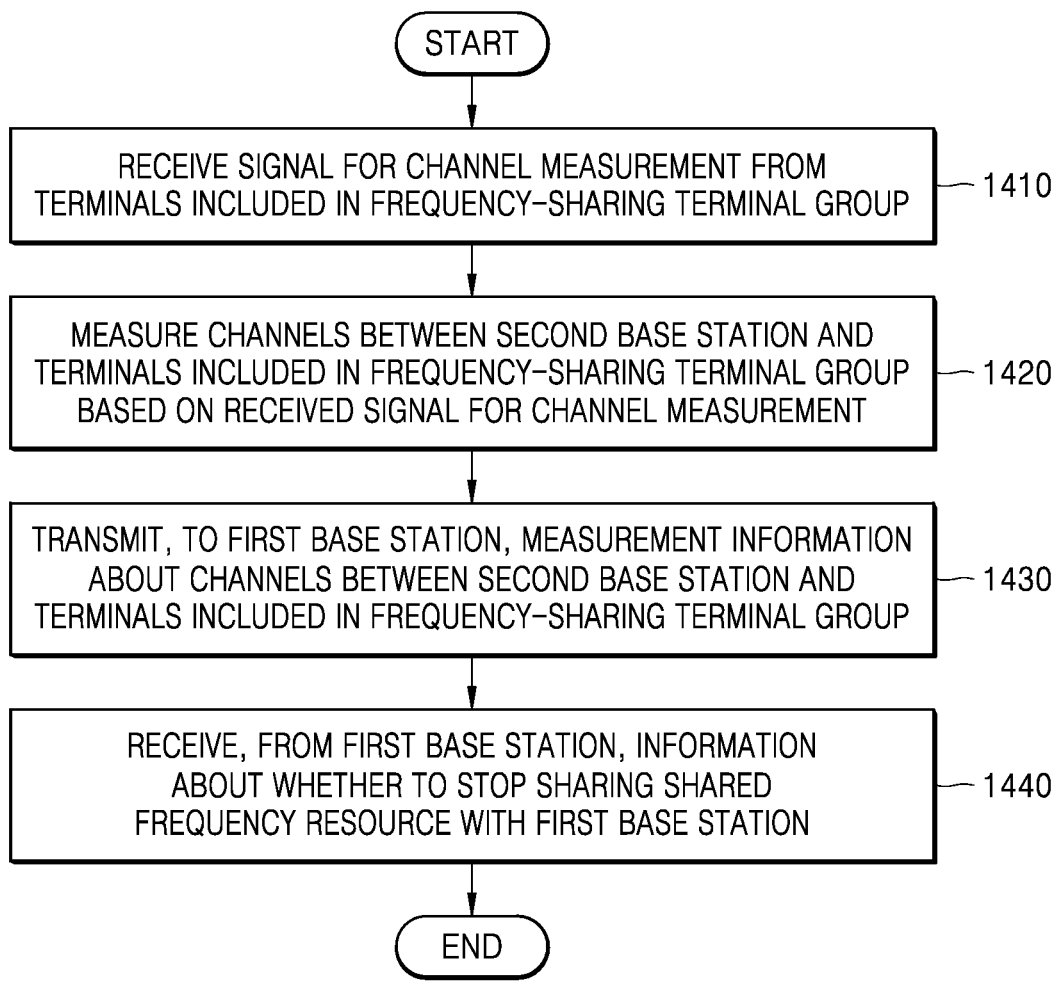
FIG. 14 is a flowchart of a method, performed by a second base station, of determining whether to stop sharing a shared frequency resource, according to an embodiment.

FIG. 14 is a flowchart of a method, performed by the second base station 20, of determining whether to stop sharing a shared frequency resource, according to an embodiment. The second base station 20 may perform steps of FIG. 14 after the steps of FIG. 9.

In step 1410, the second base station 20 receives a signal for channel measurement from the terminals included in the frequency-sharing terminal group. The second base station 20 may be in a state of being synchronized with the first base station 10 or the first terminal group. Therefore, the second base station 20 may not need to receive a signal information indicating that the signal for channel measurement is to be transmitted from the first base station 10, as in step 920 of FIG. 9.

In step 1420, the second base station 20 measures channels between the second base station and the terminals included in the frequency-sharing terminal group based on the received signal for channel measurement.

The second base station 20 measures reception strength of the received signal for channel measurement. In addition, the second base station 20 may measure the maximum transmission power, that is usable by the second base station 20 in order to transmit a signal through each of the channels between the second base station 20 and the terminals included in the frequency-sharing terminal group, according to the information about the maximum allowable level of interference with respect to signals between the first base station 10 and the terminals included in the frequency-sharing terminal group.

In step 1430, the second base station 20 transmits, to the first base station 10, measurement information about the channels between the second base station 20 and the terminals included in the frequency-sharing terminal group. Step 1430 may correspond to step 1320 of FIG. 13.

In step 1440, the second base station 20 receives, from the first base station 20, the information about whether to stop sharing the shared frequency resource with the first base station 10. Step 1440 may correspond to step 1340 of FIG. 13.

The second base station 20 may determine whether to stop communicating with the terminals included in the second terminal group using the shared frequency resource, based on the information about whether to stop sharing the shared frequency resource, which is received from the first base station 10. Alternatively, when the information indicating that the maximum transmission power that is usable by the second base station 20 in order to transmit a signal using the shared frequency resource has changed is received from the first base station 10, the second base station 20 may adjust the transmission power to be used to transmit a signal using the shared frequency resource.

Although an embodiment of determining whether to stop sharing the frequency resource through the channel measurement has been described with reference to FIG. 14, the second base station 20 may request the first base station 10 to stop sharing the shared frequency resource.

Figure 15:
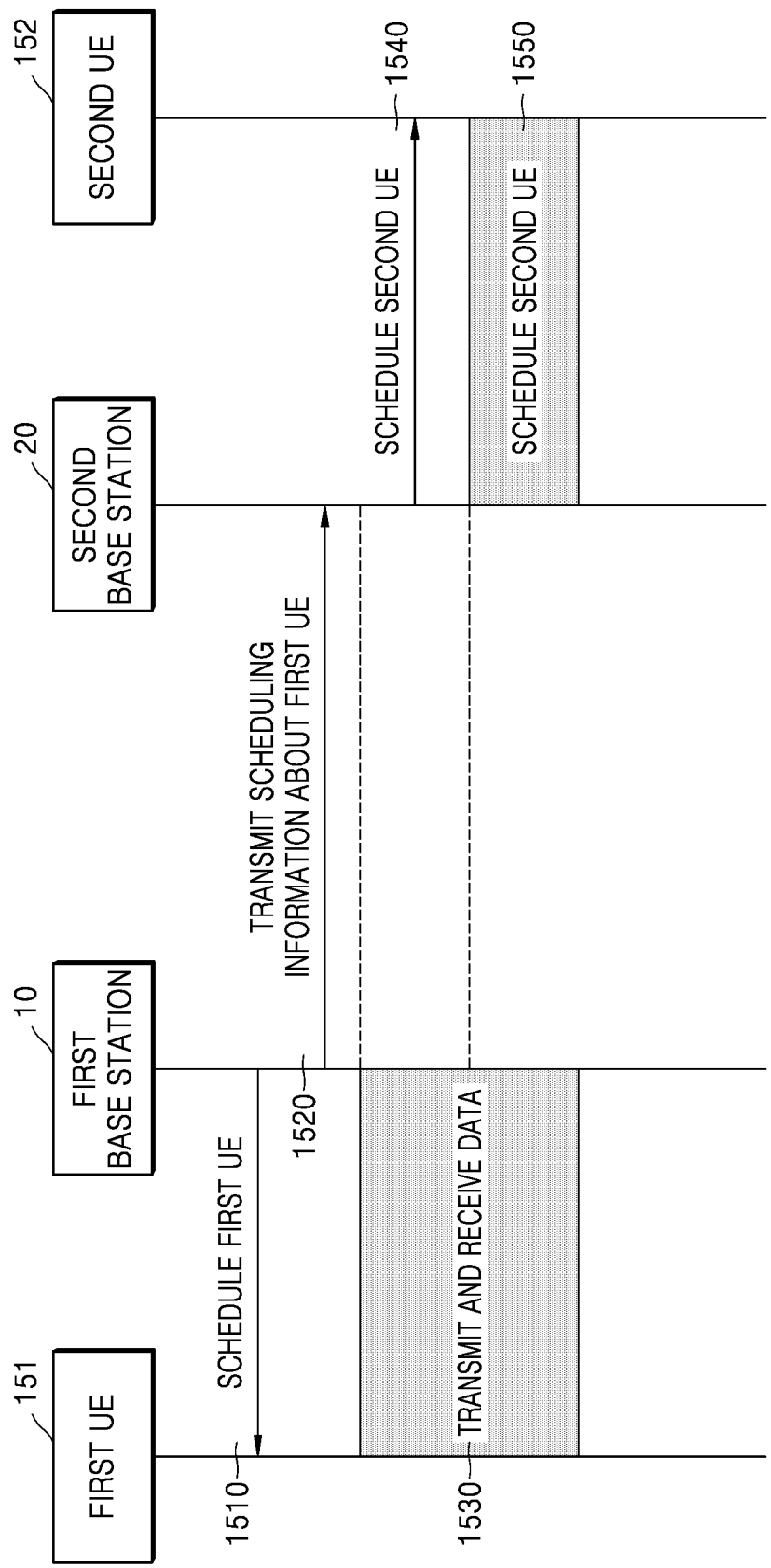
FIG. 15 is a sequence flowchart of a method of performing scheduling and data transmission and reception using a shared frequency, according to an embodiment.

FIG. 15 is a sequence flowchart of a method of performing scheduling and data transmission and reception using a shared frequency, according to an embodiment. In contrast with the embodiments of FIGS. 8 and 9, FIG. 15 illustrates an embodiment of a method of performing scheduling and data transmission and reception using a shared frequency when a first base station 10 does not determine a frequency-sharing terminal group.

In step 1510, the first base station 10 schedules a shared frequency resource to a first terminal 151. The first terminal 151 may be a terminal included in a first terminal group, and may be a terminal that determines that determines to be able to perform communication using the shared frequency resource based on channel measurement information received that the first base station 10 receives from a second base station 20.

In step 1520, the first base station 10 transmits, to the second base station 20, scheduling information using the shared frequency resource for the first terminal 151. In addition, the first base station 10 may transmit, to the second base station 20, information about the maximum transmission power, which is usable by the second base station 20 in order to transmit a signal using the shared frequency resource, with respect to the first terminal 151 (i.e., to mitigate interference that may affect the first terminal 151).

In step 1530, the first base station 10 transmits and receives data to and from the first terminal 151 according to scheduling for the first terminal 151.

In step 1540, based on the maximum transmission power that is usable by the second base station 20 in order to transmit a signal using the shared frequency resource in response to the first terminal 151, the second base station 20 determines the second terminal 152 to be communicated using the shared frequency resource from among the terminals included in the second terminal group, and performs scheduling using the shared frequency resource.

In step 1550, the second base station 20 transmits and receives data to and from the second terminal 152 using the shared frequency resource.

Referring to FIG. 15, after the second base station 20 receives, from the first base station 10, scheduling information about the first terminal 151 to be communicated using the shared frequency, the second base station 20 may determine the maximum transmission power using the shared frequency, may determine the second terminal 152 to schedule the shared frequency resource, and may transmit and receive data. Therefore, due to a signaling delay between the first base station 10 and the second base station 20 and a scheduling delay of the second base station 20, the second base station 20 may be unable to transmit and receive data to and from the second terminal 152 using the shared frequency as long as the first base station 10 transmits and receives data to and from the first terminal 151. That is, even when the second base station 20 knows information about the frequency band of the shared frequency resource, the second base station 20 may have difficulty in actually performing communication using the shared frequency resource unless the second base station 20 receives, from the first base station 10, information about terminals to perform communication using the shared frequency resource.

Figure 16:
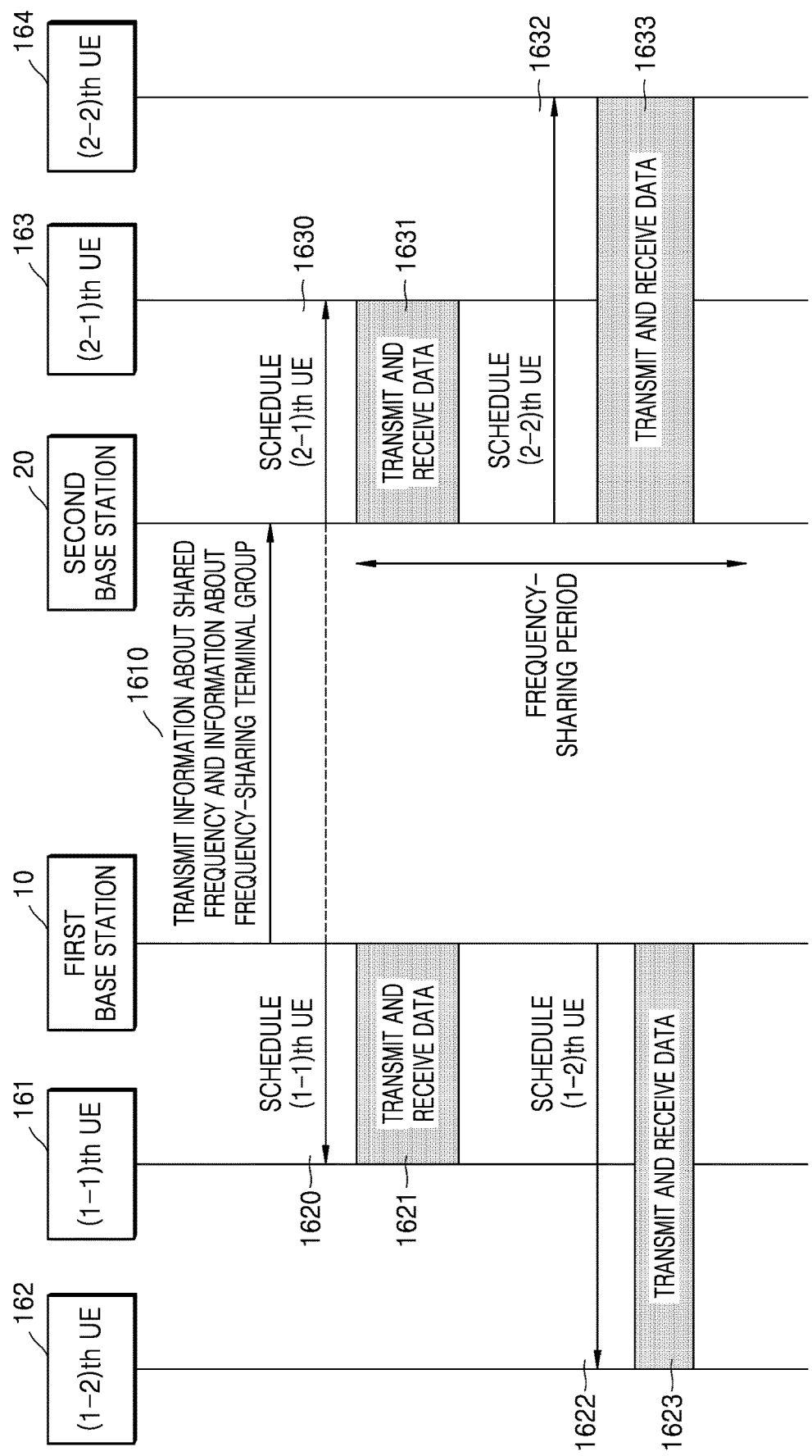
FIG. 16 is a sequence flowchart of a method of performing scheduling and data transmission and reception using a shared frequency, according to an embodiment.

FIG. 16 is a sequence flowchart of a method of performing scheduling and data transmission and reception using a shared frequency, according to an embodiment. Like the embodiments of FIGS. 8 and 9, FIG. 16 illustrates an embodiment of a method of performing scheduling and data transmission and reception using a shared frequency when a first base station 10 determines a frequency-sharing terminal group.

In step 1610, the first base station 10 transmits information about a shared frequency band and information about a frequency-sharing terminal group as information about a shared frequency resource. Step 1610 may correspond to step 850 of FIG. 8.

In step 1620, the first base station 10 schedules a (1-1)th terminal 161 included in a frequency-sharing terminal group using the shared frequency resource.

In step 1630, the second base station 20 schedules a (2-1)th terminal 163 using the shared frequency resource. Step 1630 may be performed before step 1620, that is, before the first base station 10 performs scheduling using the shared frequency resource.

In step 1621, the first base station 10 transmits and receives data to and from the (1-1)th terminal 161 using the shared frequency resource. In addition, in step 1631, the second base station 20 transmits and receives data to and from the (2-1)th terminal 163 using the shared frequency resource. Data transmission and reception between the first base station 10 and the (1-1)th terminal 161 and data transmission and reception between the second base station 20 and the (2-1)th terminal 163 may be performed simultaneously.

In step 1622, the first base station 10 schedules the (1-2)th terminal 162 included in the frequency-sharing terminal group using the shared frequency resource. In addition, in step 1623, the first base station 10 transmits and receives data to and from the (1-2)th terminal 162 using the shared frequency resource.

In step 1632, the first base station 20 schedules the (2-2)th terminal 164 included in the frequency-sharing terminal group using the shared frequency resource. In addition, in step 1633, the second base station 20 transmits and receives data to and from the (2-2)th terminal 164 using the shared frequency resource.

Referring to FIG. 16, the first base station 10 and the second base station 20 may freely perform scheduling using the shared frequency resource based on information about a shared frequency resource group. When a frequency-sharing period is configured, scheduling may be freely performed within the frequency-sharing period. In this manner, when the first base station 10 previously provides, to the second base station 20, information about the shared frequency resource group to be communicated using the shared frequency resource (e.g., information about the transmission power), the second terminal group to be communicated by the second base station 20 using the shared frequency resource may be previously determined, and the scheduling may be freely performed as necessary, regardless of the scheduling of the first base station 10.

Figure 17:
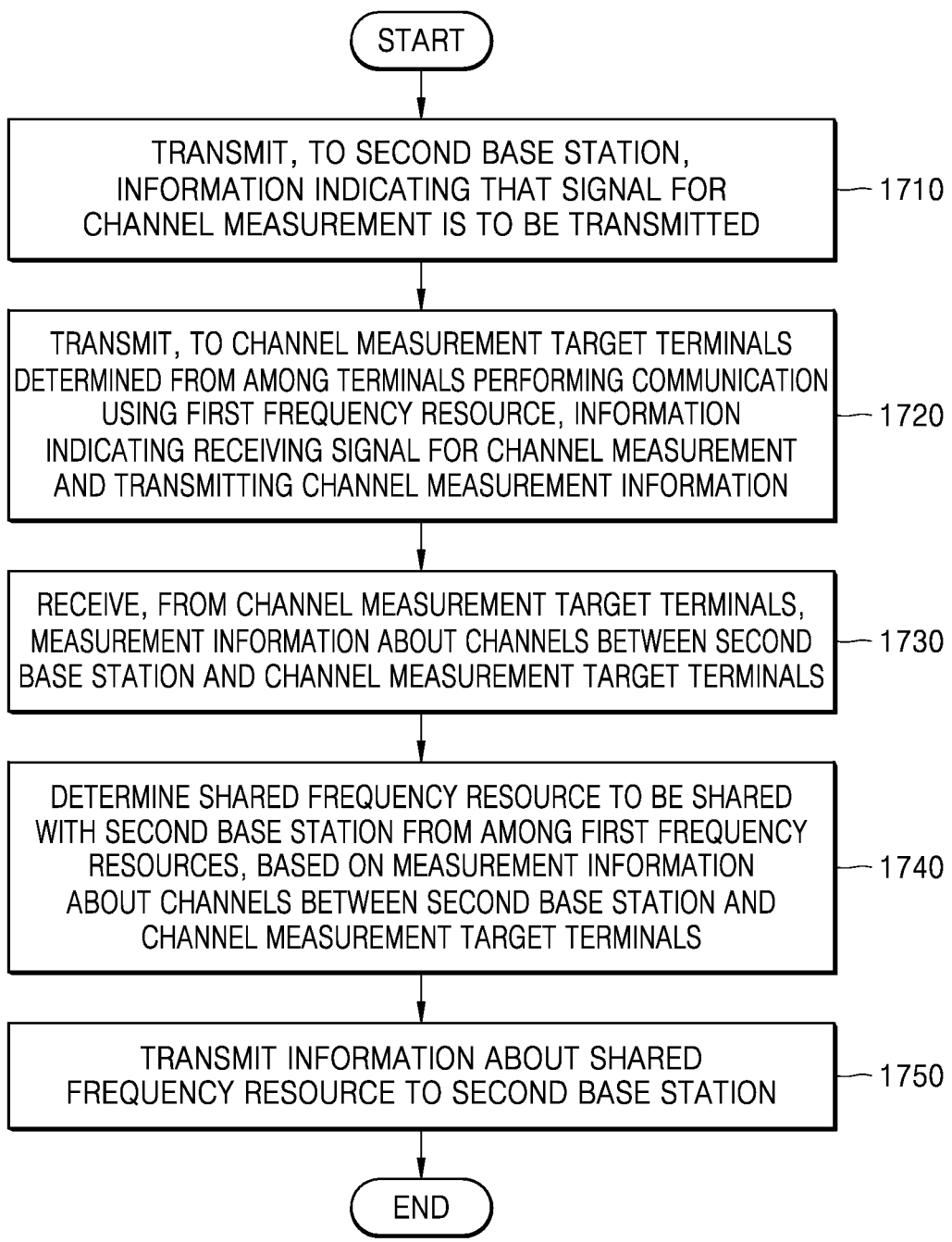
FIG. 17 is a flowchart of a method, performed by a first base station, of sharing a frequency resource with a second base station, according to an embodiment.

FIG. 17 is a flowchart of a method, performed by the first base station 10, of sharing a frequency resource with the second base station 20, according to an embodiment. In contrast with the embodiments in FIG. 8, FIG. 17 illustrates an embodiment in which channel measurement performed in order to share a frequency resource is performed based on a downlink signal.

In step 1710, the first base station 10 transmits, to the second base station 20, information indicating that a signal for channel measurement is to be transmitted.

The first base station 10 may instruct to transmit the signal for channel measurement to the second base station 10 in order to share a first frequency resource with the second base station 20 and obtain measurement information about channels between the second base station 20 and the terminals included in the first terminal group. The information instructing to transmit the signal for channel measurement may include information about a resource for transmitting the signal for channel measurement, which is to be used by the second base station 20, information to be included in the signal for channel measurement (for example, identification information of the second base station 20 or sequence information of the signal).

In step 1720, the first base station 10 transmits, to channel measurement target terminals determined from among terminals performing communication using the first frequency resource, information instructing to receive the signal for channel measurement and transmit channel measurement information. The channel measurement target terminals may correspond to the channel measurement target terminals of FIG. 8.

The first base station 10 may transmit, to the channel measurement target terminals, information indicating that the signal for channel measurement is to be transmitted from the second base station 20. The information indicating that the signal for channel measurement is to be transmitted may include information about the resource for transmitting the signal for channel measurement, information about the time at which monitoring is to be performed in order to receive the signal for channel measurement, and information about the sequence used to transmit the signal for channel measurement.

The first base station 10 may transmit information about the maximum allowable level (or strength) of interference with respect to signals between the first base station 10 and the channel measurement target terminals based on the signal that the second base station 20 transmits to the channel measurement target terminals. In addition, the first base station 10 may transmit information about the transmission power of the second base station 20 based on the signal that the second base station 20 transmits to the channel measurement target terminals.

The first base station 10 may notify the channel measurement target terminals of information that has to be included in the channel measurement information. For example, based on the signal for channel measurement, which is received from the second base station 20, the first base station 10 may request the channel measurement target terminals to measure information about the strength of the signal transmitted by the second base station 20 and information about the maximum transmission power (P_max (UE_ID)) that is usable by the second base station 20 in order to transmit a signal through each of the channels between the second base station 20 and the channel measurement target terminals. The first base station 10 may transmit the information.

In step 1730, the first base station 10 receives, from the channel measurement target terminals, measurement information about channels between the second base station 20 and the channel measurement target terminals.

The measurement information about the channels, which is received by the first base station 10, may include information about the strength of the signal measured based on the signal for channel measurement, which is transmitted by the second base station 20, and information about the maximum transmission power (P_max(UE_ID)) that is usable by the base station 20 in order to transmit a signal through each of the channels between the second base station 20 and the channel measurement target terminals.

In step 1740, the first base station 10 determines the shared frequency resource to be shared with the second base station from among the first frequency resources, based on the measurement information about the channels between the second base station 20 and the channel measurement target terminals. Step 1740 may correspond to step 840 of FIG. 8. That is, even when the channel measurement is performed based on the downlink signal, the process of determining the shared frequency resource based on the channel measurement information may be performed as in the case of FIG. 8 in which the channel measurement is performed based on the uplink signal.

In step 1750, the first base station 10 transmits the information about the shared frequency resource to the second base station 20. Step 1750 may correspond to step 850 of FIG. 8.

Figure 18:
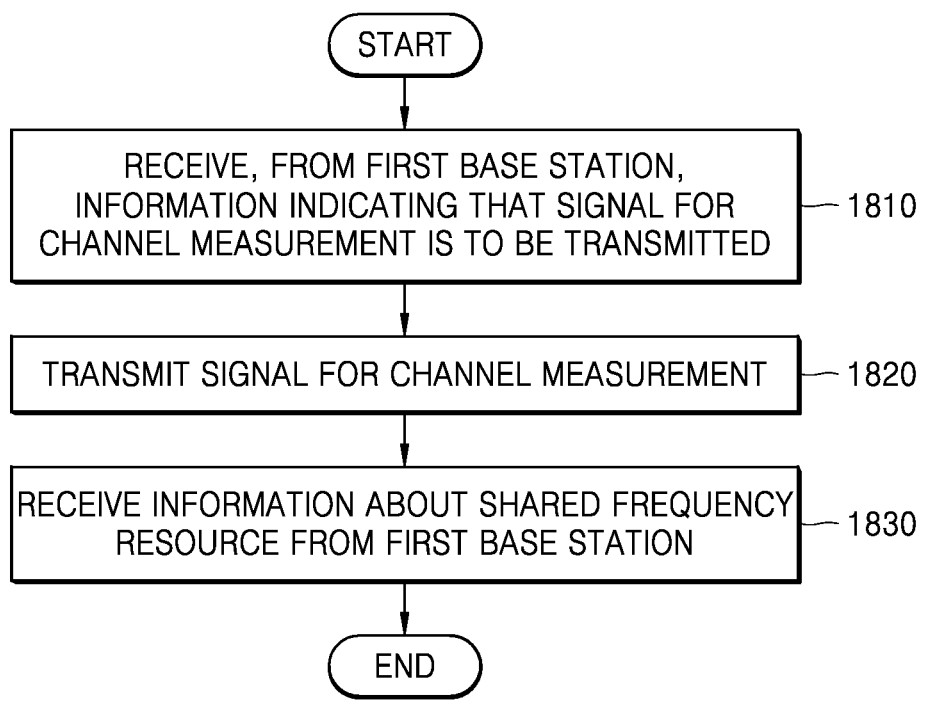
FIG. 18 is a flowchart of a method, performed by a first base station, of sharing a frequency resource with a second base station, according to an embodiment.

FIG. 18 is a flowchart of a method, performed by the first base station 10, of sharing a frequency resource with the second base station 20, according to an embodiment. In contrast with the embodiment in FIG. 9, FIG. 18 illustrates an embodiment in which channel measurement performed in order to share a frequency resource is performed based on a downlink signal.

In step 1810, the second base station 20 receives, from the first base station 10, information indicating that a signal for channel measurement is to be transmitted. Step 1810 may correspond to step 1710 of FIG. 17.

In step 1820, the second base station 20 transmits the signal for channel measurement.

The second base station 20 may transmit the signal for channel measurement based on information about the resource for transmitting the signal for channel measurement to be used by the second base station 20, which is received from the first base station 10, information to be included in the signal for channel measurement (for example, identification information of the second base station 20 or sequence information of the signal).

In step 1830, the second base station 20 receives the information about the shared frequency resource from the first base station 10. Step 1830 may correspond to step 950 of FIG. 9.

Figure 19:
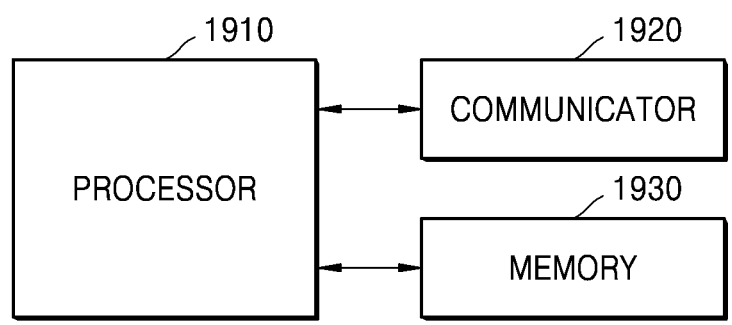
FIG. 19 is a block diagram illustrating a structure of a first base station, according to an embodiment.

FIG. 19 is a block diagram illustrating a structure of a first base station, according to an embodiment.

Referring to FIG. 19, the first base station includes a processor 1910, a communicator 1920, and a memory 1930. However, the elements of the first base station 10 are not limited to the above-described example. For example, the first base station 10 may include more elements or fewer elements than the above-described elements. In addition, the processor 1910, the communicator 1920, and the memory 1930 may be implemented in the form of a single chip.

The processor 1910 may control a series of processes in which the first base station may operate according to the above-described embodiment of the disclosure. For example, the processor 1910 may control the elements of the first base station to perform a method of sharing a frequency resource dynamically in a wireless communication system. The processor 1910 may include a plurality of processors. The processor 1910 may execute a program stored in the memory 1930 to perform the operations according to the above-described embodiments.

The communicator 1920 may transmit and receive signals to and from a second base station, a terminal. The signals, which are transmitted and received by the communicator 1920, may include control information and data. The communicator 1920 may include an RF transmitter that performs up-conversion and amplification on a frequency of a signal to be transmitted, and an RF receiver that performs low-noise amplification on a received signal and performs down-conversion on a frequency of the received signal. However, the communicator 1920 is only an embodiment, and the elements of the communicator 1920 are not limited to the RF transmitter and the RF receiver. In addition, the communicator 1920 may receive a signal through a radio channel, output the signal to the processor 1910, and transmit an output signal of the processor 1910 through the radio channel.

The memory 1930 may store programs and data necessary for the operation of the first base station 10. In addition, the memory 1930 may store control information or data included in the signals transmitted and received by the first base station. The memory 1930 may include a storage medium such as a read-only memory (ROM), a random access memory (RAM), a hard disk, a compact disc read-only memory (CD-ROM), and a digital versatile disc (DVD), or any combination thereof. In addition, the memory 1930 may include a plurality of memories. The memory 1930 may store programs for performing the operations according to the above-described embodiments.

Figure 20:
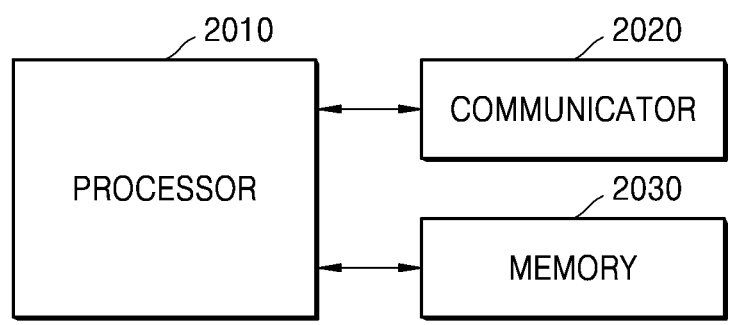
FIG. 20 is a block diagram illustrating a structure of a second base station, according to an embodiment.

FIG. 20 is a block diagram illustrating a structure of a second base station, according to an embodiment.

Referring to FIG. 20, the second base station includes a processor 2010, a communicator 2020, and a memory 2030. However, the elements of the second base station 20 are not limited to the above-described example. For example, the second base station may include more elements or fewer elements than the above-described elements. In addition, the processor 2010, the communicator 2020, and the memory 2030 may be implemented in the form of a single chip.

The processor 2010 may control a series of processes in which the second base station may operate according to the above-described embodiment of the disclosure. For example, the processor 2010 may control the elements of the second base station to perform a method of sharing a frequency resource dynamically in a wireless communication system. The processor 2010 may include a plurality of processors. The processor 2010 may execute a program stored in the memory 2030 to perform the operations according to the above-described embodiments.

The communicator 2020 may transmit and receive signals to and from the second base station. The signals, which are transmitted and received to and from the second base station, may include control information and data. The communicator 2020 may include an RF transmitter that performs up-conversion and amplification on a frequency of a signal to be transmitted, and an RF receiver that performs low-noise amplification on a received signal and performs down-conversion on a frequency of the received signal. However, the communicator 2020 is only an embodiment, and the elements of the communicator 2020 are not limited to the RF transmitter and the RF receiver. In addition, the communicator 2020 may receive a signal through a radio channel, output the signal to the processor 2010, and transmit an output signal of the processor 2010 through the radio channel.

The memory 2030 may store programs and data necessary for the operation of the second base station 20. In addition, the memory 2030 may store control information or data included in the signals transmitted and received by the second base station 20. The memory 2030 may include a storage medium such as a ROM, a RAM a hard disk, a CD-ROM, and a DVD, or any combination thereof. In addition, the memory 2030 may include a plurality of memories. The memory 2030 may store programs for performing the operations according to the above-described embodiments.

The frequency resource may be shared dynamically in the wireless communication system.

The embodiments of the disclosure, which are described in this specification and drawings, are merely presented as specific examples so as to easily explain the technical contents of the disclosure and help the understanding of the disclosure and are not intended to limit the scope of the disclosure. That is, it will be obvious to those of ordinary skill in the art that other modifications based on the technical idea of the disclosure may be made. In addition, the respective embodiments of the disclosure may be operated in combination with each other as necessary. For example, some portions of the embodiments of the disclosure may be combined with each other so that the base stations and the terminals are operated. In addition, although the embodiments of the disclosure have been presented based on the NR system, other modifications based on the technical idea of the embodiments of the disclosure may also be applied to other systems such as frequency division duplex (FDD) or time division duplex (TDD) LTE systems.

In addition, embodiments of the disclosure have been described and illustrated in the present specification and drawings. Although certain terms are used herein, this is merely used in a general sense to easily describe the technical idea of the disclosure and to help understanding the disclosure, and is not intended to limit the scope of the disclosure.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method, performed by a first base station, of sharing a frequency resource with a second base station in a wireless communication system, the method comprising:
transmitting, to one or more channel measurement target terminals determined from among terminals communicating with the first base station using first frequency resources, information instructing to transmit a signal for channel measurement to the second base station;
transmitting, to the second base station, information indicating that the signal for channel measurement is to be transmitted from the one or more channel measurement target terminals;
receiving, from the second base station, measurement information about channels between the second base station and the one or more channel measurement target terminals, wherein the measurement information includes information about at least one first maximum transmission power of the second base station corresponding to the one or more channel measurement target terminals, which is determined by the second base station;
determining a shared frequency resource to be shared with the second base station from among the first frequency resources, based on the measurement information about the channels between the second base station and the one or more channel measurement target terminals; and
transmitting information about the shared frequency resource to the second base station,
wherein the at least one first maximum transmission power is determined based on information about a maximum allowable level of interference.

2. The method of claim 1, wherein the information indicating that the signal for channel measurement is to be transmitted includes at least one of information about a resource for transmitting the signal for channel measurement or information about a sequence to be used to transmit the signal for channel measurement.

3. The method of claim 2, wherein the resource for transmitting the signal for channel measurement includes symbols of a certain time length or greater.

4. The method of claim 1, wherein the information indicating that the signal for channel measurement is to be transmitted includes at least one of information about a resource for transmitting the signal for channel measurement, information about a time at which monitoring is to be performed in order to receive the signal for channel measurement, or information about a sequence used to transmit the signal for channel measurement.

5. The method of claim 1, wherein the information indicating that the signal for channel measurement is to be transmitted includes the information about the maximum allowable level of interference with respect to signals between the first base station and the one or more channel measurement target terminals by a signal transmitted by the second base station.

6. The method of claim 1, wherein determining the shared frequency resource comprises:
determining a frequency-sharing terminal group including terminals to communicate with the first base station using the shared frequency resource from among the terminals communicating with the first base station using the first frequency resources; and
determining a second maximum transmission power of the second base station in case that the second base station uses the shared frequency resource based on the frequency-sharing terminal group,
wherein the information about the shared frequency resource includes at least one of information about a frequency band of the shared frequency resource, information about the frequency-sharing terminal group, or information about the second maximum transmission power.

7. The method of claim 6, wherein the frequency-sharing terminal group is determined based on at least one of the measurement information about the channels or information about locations of the terminals communicating with the first base station using the first frequency resources.

8. The method of claim 6, further comprising:
transmitting, to the terminals included in the frequency-sharing terminal group, information instructing to transmit the signal for measuring the channel to the second base station; and
receiving, from the second base station, the measurement information about the channels between the second base station and the terminals included in the frequency-sharing terminal group.

9. The method of claim 8, further comprising:
determining whether to stop sharing the shared frequency resource with the second base station, based on the measurement information about the channels between the second base station and the terminals included in the frequency-sharing terminal group; and
transmitting, to the second base station, the information about whether to stop sharing the shared frequency resource with the second base station.

10. A method, performed by a second base station, of sharing a frequency resource with a first base station in a wireless communication system, the method comprising:

receiving, from the first base station, information indicating that a signal for channel measurement is to be transmitted from one or more channel measurement target terminals determined from among terminals communicating with the first base station using first frequency resources;

receiving the signal for channel measurement from the one or more channel measurement target terminals;

measuring channels between the second base station and the one or more channel measurement target terminals based on the signal for channel measurement and the information indicating that the signal for channel measurement is to be transmitted, wherein the measuring of the channels includes determining at least one first maximum transmission power of the second base station corresponding to the one or more channel measurement target terminals;

transmitting, to the first base station, measurement information about the channels between the second base station and the one or more channel measurement target terminals, wherein the measurement information includes information about the at least one first maximum transmission power of the second base station; and receiving, from the first base station, information about a shared frequency resource that the first base station is to share with the second base station from among the first frequency resources, wherein the shared frequency resource is determined based on the measurement information about the channels between the second base station and the one or more channel measurement target terminals, and wherein the at least one first maximum transmission power is determined based on information about a maximum allowable level of interference.

11. The method of claim 10, wherein the information indicating that the signal for channel measurement is to be transmitted includes at least one of information about a resource for transmitting the signal for channel measurement, information about a time at which monitoring is to be performed in order to receive the signal for channel measurement, or information about a sequence used to transmit the signal for channel measurement.

12. The method of claim 11, wherein receiving the signal for channel measurement comprises:

monitoring signals based on the information about the resource for transmitting the signal for channel measurement and the information about the time at which the monitoring is to be performed in order to receive the signal for channel measurement; and obtaining the signal for channel measurement from among the monitored signals.

13. The method of claim 10, wherein the resource for transmitting the signal for channel measurement includes symbols of a certain time length or greater.

14. The method of claim 10, wherein the information indicating that the signal for channel measurement is to be transmitted includes the information about the maximum allowable level of interference with respect to signals between the first base station and the one or more channel measurement target terminals by a signal transmitted by the second base station.

15. The method of claim 10, wherein the information about the shared frequency resource includes at least one of information about a frequency band of the shared frequency resource, information about a frequency-sharing terminal group, or information about a second maximum transmission power of the second base station in case that the second base station uses the shared frequency resource, wherein the frequency-sharing terminal group comprises terminals to communicate with the first base station using the shared frequency resource from among the terminals communicating with the first base station using the first frequency resources, and wherein the second maximum transmission power is determined based on the frequency-sharing terminal group.

16. The method of claim 15, wherein the frequency-sharing terminal group is determined based on at least one of the measurement information about the channels or information about locations of the terminals communicating with the first base station using the first frequency resources.

17. A first base station for sharing a frequency resource with a second base station in a wireless communication system, the first base station comprising:

a communicator;

a memory; and at least one processor connected to the communicator, and configured to:

transmit, to one or more channel measurement target terminals determined from among terminals communicating with the first base station using first frequency resources, information instructing to transmit a signal for channel measurement to the second base station;

transmit, to the second base station, information indicating that the signal for channel measurement is to be transmitted from the one or more channel measurement target terminals;

receive, from the second base station, measurement information about channels between the second base station and the one or more channel measurement target terminals, wherein the measurement information includes information about at least one first maximum transmission power of the second base station corresponding to the one or more channel measurement target terminals, which is determined by the second base station;

determine a shared frequency resource to be shared with the second base station from among the first frequency resources, based on the measurement information about the channels between the second base station and the one or more channel measurement target terminals; and transmit information about the shared frequency resource to the second base station, wherein the at least one first maximum transmission power is determined based on information about a maximum allowable level of interference.

18. A second base station for sharing a frequency resource with a first base station in a wireless communication system, the second base station comprising:

a communicator;

a memory; and at least one processor connected to the communicator, and configured to:

receive, from the first base station, information indicating that a signal for channel measurement is to be transmitted from one or more channel measurement target terminals determined from among terminals communicating with the first base station using first frequency resources;

receive the signal for channel measurement from the one or more channel measurement target terminals;

measure channels between the second base station and the one or more channel measurement target terminals based on the signal for channel measurement and the information indicating that the signal for channel measurement is to be transmitted, wherein the measuring of the channels includes determining at least one first maximum transmission power of the second base station corresponding to the one or more channel measurement target terminals;

transmit, to the first base station, measurement information about the channels between the second base station and the one or more channel measurement target terminals, wherein the measurement information includes information about the at least one first maximum transmission power; and receive, from the first base station, information about a shared frequency resource to be shared with the second base station from among the first frequency resources, which is determined based on the measurement information about the channels between the second base station and the one or more channel measurement target terminals, wherein the at least one first maximum transmission power is determined based on information about a maximum allowable level of interference.

19. The method of claim 1, wherein determining of the shared frequency resource comprises:

determining a second maximum transmission power of the second base station in case that the second base station uses the shared frequency resource, based on the information about the at least one first maximum transmission power, wherein the information about the shared frequency resource includes information about the second maximum transmission power.

20. The method of claim 11, wherein the information about the shared frequency resource includes information about a second maximum transmission power of the second base station in case that the second base station uses the shared frequency resources, and the second maximum transmission power is determined based on the at least one first maximum transmission power.

\* \* \* \* \*